(12) United States Patent
Bono et al.

(10) Patent No.: US 11,150,845 B2
(45) Date of Patent: Oct. 19, 2021

(54) METHODS AND SYSTEMS FOR SERVICING DATA REQUESTS IN A MULTI-NODE SYSTEM

(71) Applicant: EMC IP Holding Company LLC, Hopkinton, MA (US)

(72) Inventors: Jean-Pierre Bono, Westboro, MA (US); Marc A. De Souter, Wayne, NJ (US); Adrian Michaud, Carlisle, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/672,236

(22) Filed: Nov. 1, 2019

(65) Prior Publication Data

US 2021/0132870 A1 May 6, 2021

(51) Int. Cl.
  *G06F 3/06* (2006.01)
  *G06F 12/1081* (2016.01)
  *G06F 9/50* (2006.01)

(52) U.S. Cl.
  CPC .......... *G06F 3/0665* (2013.01); *G06F 3/0604* (2013.01); *G06F 3/065* (2013.01);
  (Continued)

(58) Field of Classification Search
  CPC ...... G06F 3/0665; G06F 3/0604; G06F 3/065; G06F 3/067; G06F 2212/7201;
  (Continued)

(56) References Cited

U.S. PATENT DOCUMENTS

| | | |
|---|---|---|
| 5,394,537 A | 2/1995 | Courts et al. |
| 6,167,531 A | 12/2000 | Sliwinski |

(Continued)

OTHER PUBLICATIONS

R. Brightwell and K. Pedretti, "Optimizing Multi-core MPI Collectives with SMARTMAP," 2009 International Conference on Parallel Processing Workshops, Vienna, Austria, 2009, pp. 370-377, doi: 10.1109/ICPPW.2009.65. (Year: 2009).*

(Continued)

*Primary Examiner* — Khoa D Doan
(74) *Attorney, Agent, or Firm* — Chamberlain, Hrdlicka, White, Williams & Aughtry

(57) ABSTRACT

A method for processing requests includes receiving a request comprising a virtual address, wherein the request is associated with an application executing on an operating system, identifying, based on data specified in the request, a logical volume associated with the data, making a first determination, based on the logical volume, that the logical volume is managed by a remote node, generating a data layout request to receive a data layout of the data from the remote node, receiving the data layout, wherein the data layout specifies a first physical address on the remote node that stores the data, initiating a copy request to copy the data from the first physical address to a second physical address on a local node, generating, based on the copy request, a virtual-to-physical address mapping between the virtual address and the second physical address; and initiating processing the request using the virtual-to-physical address mapping.

20 Claims, 23 Drawing Sheets

(52) U.S. Cl.
CPC ............ *G06F 3/067* (2013.01); *G06F 9/5016* (2013.01); *G06F 12/1081* (2013.01); *G06F 2209/5011* (2013.01); *G06F 2212/7201* (2013.01)

(58) Field of Classification Search
CPC ......... G06F 2209/5011; G06F 12/1081; G06F 9/50; G06F 9/5016
See application file for complete search history.

(56) References Cited

U.S. PATENT DOCUMENTS

| | | | |
|---|---|---|---|
| 6,370,618 B1 | 4/2002 | Arimilli | |
| 6,920,110 B2 | 7/2005 | Roberts | |
| 7,188,273 B2 | 3/2007 | Mien et al. | |
| 9,069,553 B2 | 6/2015 | Zaarur et al. | |
| 9,250,953 B2 | 2/2016 | Kipp | |
| 9,330,103 B1 | 5/2016 | Bono et al. | |
| 9,443,095 B2 | 9/2016 | Lahteenmaki | |
| 9,485,310 B1 | 11/2016 | Bono et al. | |
| 9,501,419 B2 | 11/2016 | Rastogi | |
| 10,261,722 B2* | 4/2019 | Bohling | G06F 3/067 |
| 2006/0101081 A1 | 5/2006 | Lin et al. | |
| 2007/0180302 A1 | 8/2007 | Mien et al. | |
| 2008/0010496 A1 | 1/2008 | Das et al. | |
| 2008/0244307 A1 | 10/2008 | Dasari et al. | |
| 2009/0089537 A1* | 4/2009 | Vick | G06F 12/1072 |
| | | | 711/203 |
| 2009/0248957 A1 | 10/2009 | Tzeng | |
| 2009/0287902 A1 | 11/2009 | Fullerton | |
| 2009/0307538 A1 | 12/2009 | Hernandez et al. | |
| 2010/0268788 A1* | 10/2010 | Arimilli | G06F 9/54 |
| | | | 709/213 |
| 2011/0289519 A1 | 11/2011 | Frost | |
| 2013/0111136 A1 | 5/2013 | Bell, Jr. | |
| 2013/0111146 A1 | 5/2013 | Ash | |
| 2016/0055062 A1 | 2/2016 | Petri et al. | |
| 2016/0224244 A1 | 8/2016 | Gensler, Jr. et al. | |
| 2017/0052723 A1* | 2/2017 | Voigt | G06F 3/0679 |
| 2017/0075812 A1 | 3/2017 | Wu | |
| 2017/0286153 A1 | 10/2017 | Bak et al. | |
| 2018/0343131 A1* | 11/2018 | George | G06F 16/214 |
| 2018/0349238 A1 | 12/2018 | Boshev et al. | |

OTHER PUBLICATIONS

Dr. Amit Golander, NetApp; "ZUFS—How to develop an efficient PM-based file system in user space"; SNIA Storage Development Conference EMEA; Feb. 2018.

Dr. Amit Golander, NetApp; "ZUFS—Simplifying the Development of PM-Based File Systems"; SNIA Persistent Memory Summit 2018; Jan. 24, 2018.

Shachar Sharon (NetApp); "ZUFS Overview—Developing PMEM-based File-System in User-Space"; Persistent Programming In Real Life(PIRL'19), University of California, San Diego; Jul. 22, 2019; https://pirl.nvsl.io/program/.

* cited by examiner

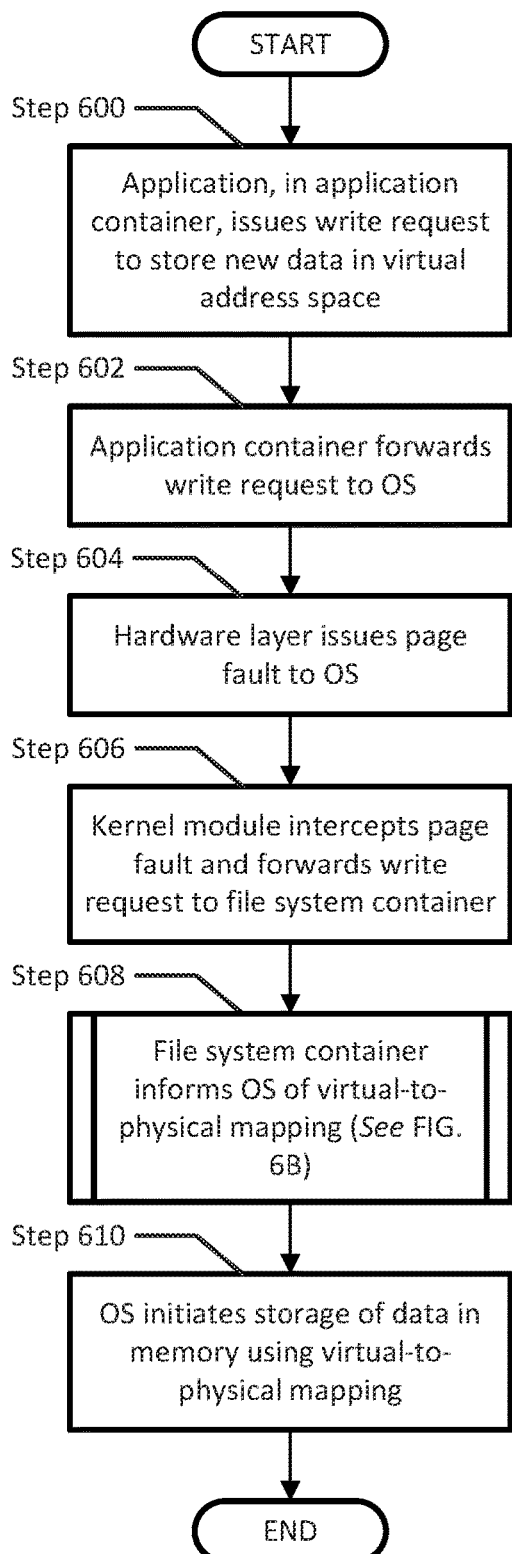
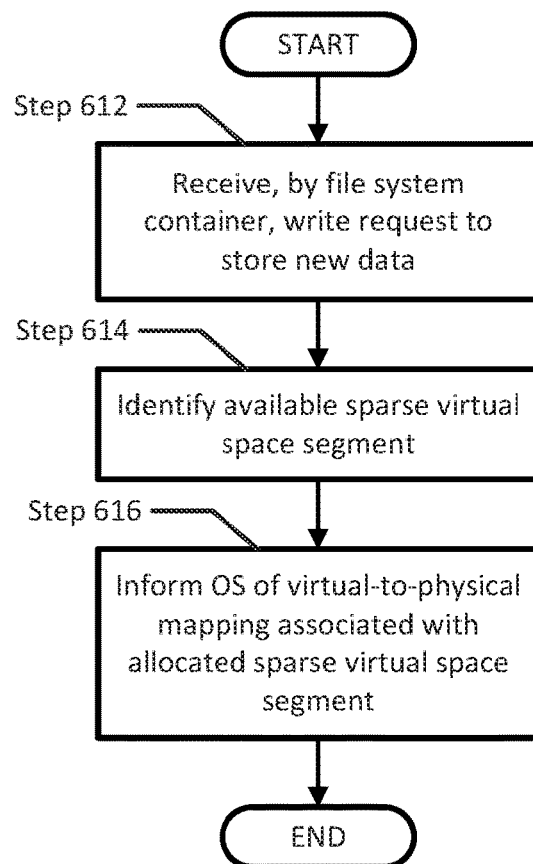
FIG. 6A
FIG. 6B

METHODS AND SYSTEMS FOR SERVICING DATA REQUESTS IN A MULTI-NODE SYSTEM

BACKGROUND

Devices and/or components of devices are often capable of performing certain functionalities that other devices and/or components are not configured to perform and/or are not capable of performing. In such scenarios, it may be desirable to adapt one or more system to enhance the functionalities of devices and/or components that cannot perform the one or more functionalities.

SUMMARY

In general, in one aspect, the invention relates to a method for processing requests. The method includes receiving, by a space manager, a request comprising a virtual address, wherein the request is associated with an application executing on an operating system and wherein the space manager is executing in a container on the operating system, identifying, based on data specified in the request, a logical volume associated with the data, making a first determination, based on the logical volume, that the logical volume is managed by a remote node, generating a data layout request to receive a data layout of the data from the remote node, receiving, from the remote node, the data layout, wherein the data layout specifies a first physical address on the remote node that stores the data, initiating a copy request to copy the data from the first physical address to a second physical address on a local node, generating, based on the copy request, a virtual-to-physical address mapping between the virtual address and the second physical address; and initiating processing the request using the virtual-to-physical address mapping.

In general, in one aspect, the invention relates to a non-transitory computer readable medium that includes instructions which, when executed by a computer processor, enables the computer processor to perform a method for processing requests. The method includes receiving, by a space manager, a request comprising a virtual address, wherein the request is associated with an application executing on an operating system and wherein the space manager is executing in a container on the operating system, identifying, based on data specified in the request, a logical volume associated with the data, making a first determination, based on the logical volume, that the logical volume is managed by a remote node, generating a data layout request to receive a data layout of the data from the remote node, receiving, from the remote node, the data layout, wherein the data layout specifies a first physical address on the remote node that stores the data, initiating a copy request to copy the data from the first physical address to a second physical address on a local node, generating, based on the copy request, a virtual-to-physical address mapping between the virtual address and the second physical address; and initiating processing the request using the virtual-to-physical address mapping.

In general, in one aspect, the invention relates to a node that includes memory, persistent storage, and a processor, wherein the processor is configured to receive, by a space manager, a request comprising a virtual address, wherein the request is associated with an application executing on an operating system and wherein the space manager is executing in a container on the operating system, identify, based on data specified in the request, a logical volume associated with the data, make a first determination, based on the logical volume, that the logical volume is managed by a remote node, generate a data layout request to receive a data layout of the data from the remote node, receive, from the remote node, the data layout, wherein the data layout specifies a first physical address on the remote node that stores the data, initiate a copy request to copy the data from the first physical address to a second physical address on a local node, generate, based on the copy request, a virtual-to-physical address mapping between the virtual address and the second physical address, and initiating processing the request using the virtual-to-physical address mapping.

Other aspects of the invention will be apparent from the following description and the appended claims.

BRIEF DESCRIPTION OF DRAWINGS

FIG. 6A shows a flowchart of a method of generating and servicing a write request in accordance with one or more embodiments of the invention.

FIG. 6B shows a flowchart of a method of servicing a write request in accordance with one or more embodiments of the invention.

DETAILED DESCRIPTION

Figure 1:
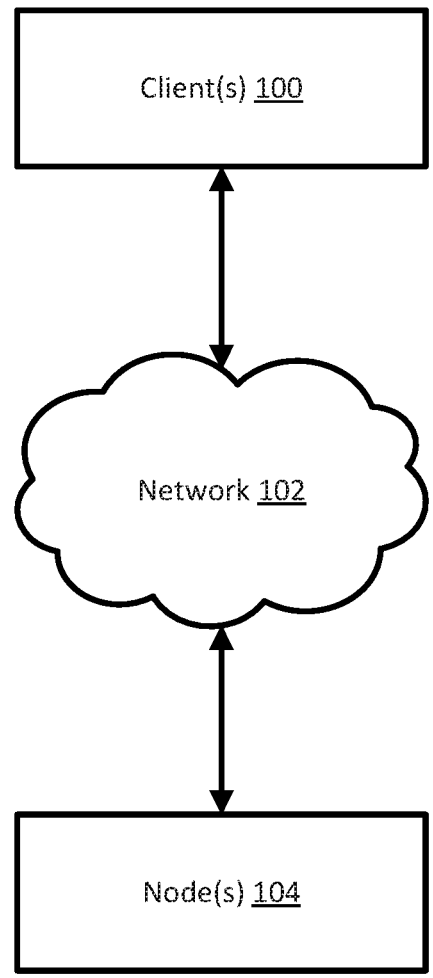
FIG. 1 shows a diagram of a system in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems, devices, and methods for implementing and leveraging persistent memory to improve performance of data requests. More specifically, embodiments of the invention relate to a data management service that identifies, intercepts, and redirects requests to appropriate physical devices to optimize utilization of components of the system. Further, embodiments of the invention are directed to allowing for direct manipulation of persistent memory.

Embodiments of the invention described herein allow for, at least, implementing and intelligently leveraging memory to enhance performance. While the invention has been described with respect to a limited number of embodiments and examples, those skilled in the art, having benefit of this detailed description, would appreciate that other embodiments can be devised which do not depart from the scope of the invention as disclosed herein. Accordingly, the scope of the invention should be limited only by the attached claims.

FIG. 1 shows a diagram of a system in accordance with one or more embodiments of the invention. The system includes one or more client(s) (100), operatively connected to a network (102), which is operatively connected to one or more node(s) (104). The components illustrated in FIG. 1 may be connected via any number of operable connections supported by any combination of wired and/or wireless networks (e.g., network (102)). Each component of the system of FIG. 1 is discussed below.

In one embodiment of the invention, client(s) (100) are configured to issue requests to the node(s) (104) (or to a specific node of the node(s) (104)), to receive responses, and to generally interact with the various components of a node (described below).

In one or more embodiments of the invention, client(s) (100) are implemented as computing devices. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one or more embodiments of the invention, the client(s) (120) is implemented as a logical device. The logical device may utilize the computing resources of any number of computing devices and thereby provide the functionality of the client(s) (100) described throughout this application.

In one or more embodiments of the invention, client(s) (100) may request data and/or send data to the node(s) (104). Further, in one or more embodiments, client(s) (100) may initiate an application to execute on one or more node(s) (104) such the application may, itself, gather, transmit, and/or otherwise manipulate data on the node (e.g., node(s) (104)), remote to the client(s). In one or more embodiments, one or more client(s) (100) may share access to the same one or more node(s) (104) and may similarly share any data located on those node(s) (104).

In one or more embodiments of the invention, network (102) of the system is a collection of connected network devices that allow for the communication of data from one network device to other network devices, or the sharing of resources among network devices. Examples of a network (e.g., network (102)) include, but are not limited to, a local area network (LAN), a wide area network (WAN) (e.g., the Internet), a mobile network, or any other type of network that allows for the communication of data and sharing of resources among network devices and/or devices (e.g., clients (100), node(s) (104)) operatively connected to the network (102). In one embodiment of the invention, the client(s) (100) are operatively connected to the node(s) (104) via a network (e.g., network (102)).

Various embodiments of the node(s) (104) are provided in FIG. 2 and FIG. 3 below.

While FIG. 1 shows a specific configuration of a system, other configurations may be used without departing from the scope of the disclosure. For example, although the client(s) (100) and node(s) (104) are shown to be operatively connected through network (102), client(s) (100) and node(s) (104) may be directly connected, without an intervening network (e.g., network (102)). Further, the functioning of the client(s) (100) and the node(s) (104) is not dependent upon the functioning and/or existence of the other device(s) (e.g., node(s) (104) and client(s) (100), respectively). Rather, the client(s) (100) and the node(s) (104) may function independently and perform operations locally that do not require communication with other devices. Accordingly, embodiments disclosed herein should not be limited to the configuration of devices and/or components shown in FIG. 1.

Figure 2:
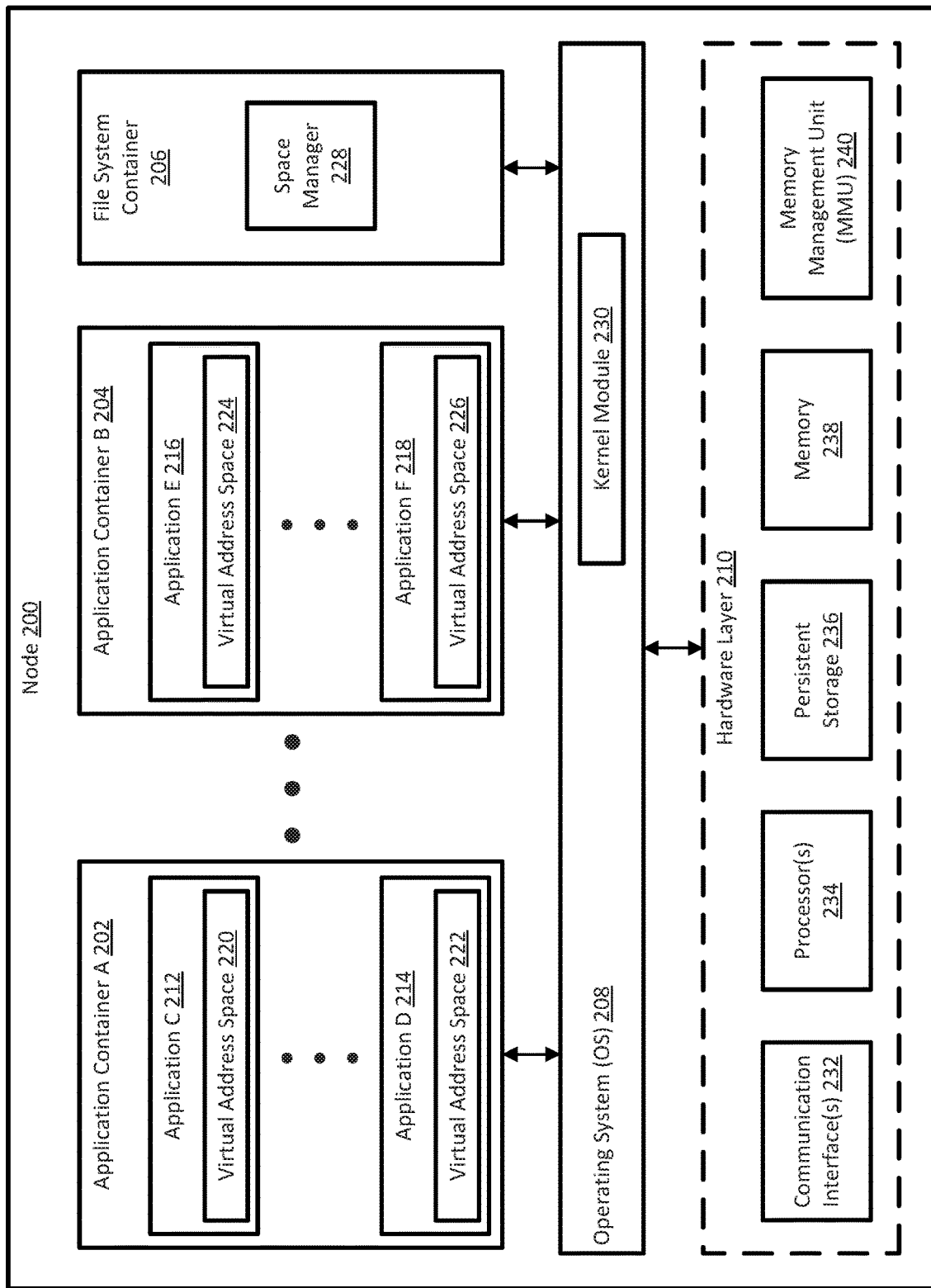
FIG. 2 shows a diagram of a node in accordance with one or more embodiments of the invention.

FIG. 2 shows a diagram of a node (200) in accordance with one or more embodiments of the invention. In one embodiment of the invention, node (200) includes one or more application container(s) (e.g., application container A (202), application container B (204)), a file system container (206), an operating system (OS) (208), and a hardware layer (210). Each of these components is described below. In one or more embodiments of the invention, the node (200) is configured to perform all, or a portion, of the functionality described in FIGS. 5-11.

In one or more embodiments of the invention, an application container (202, 204) is software executing on the node. In one embodiment of the invention, an application container (202, 204) may be an independent software instance that executes within a larger container management software instance (not shown) (e.g., Docker®, Kubernetes®). In one embodiment, where the application container (202, 204) is executing as an isolated software instance, the application container (202, 204) may establish a semi-isolated virtual environment, inside the container, in which to execute one or more applications (e.g., applications (212, 214, 216, 218), described below). In one embodiment of the invention, an application container (202, 204) may be executing in "user space" (e.g., a layer of the software that utilizes low-level system components for the execution of applications) of the operating system (OS) (208) of the node (200).

In one or more embodiments of the invention, an application container (202, 204) includes one or more applications (e.g., application C (212), application D (214), application E (216), application F (218)). In one embodiment of the invention, an application (212, 214, 216, 218) is software executing within the application container (e.g., 202, 204), that may include instructions which, when executed by a processor(s) (234), initiate the performance of one or more operations of components of the hardware layer (210). Although applications (212, 214, 216, 218) are shown executing within application containers (202, 204) of FIG. 2, one or more applications (e.g., 212, 214, 216, 218) may execute outside of an application container (e.g., 212, 214, 216, 218). That is, in one or more embodiments, one or more applications (e.g., 212, 214, 216, 218) may execute in a non-isolated instance, at the same level as the application container (202, 204) or file system container (206).

In one or more embodiments of the invention, each application (212, 214, 216, 218) includes a virtual address space (e.g., virtual address space (220), virtual address space (222), virtual address space (224), virtual address space (226)). In one embodiment of the invention, a virtual address space (220, 222, 224, 226) is a simulated range of addresses (e.g., identifiable locations) that mimics the physical locations of one or more components of the hardware layer (210). In one embodiment, an application (212, 214, 216, 218) is not configured to identify the physical addresses of one or more components of the hardware layer (210); rather, the application (212, 214, 216, 218) relies on other components of the node (200) to translate one or more virtual addresses of the virtual address space (e.g., 220, 222, 224, 226) to one or more physical addresses of one or more components of the hardware layer (210). Accordingly, in one or more embodiments of the invention, an application may utilize a virtual address space (220, 222, 224, 226) to read, write, and/or otherwise manipulate data, without being configured to directly identify the physical address of that data within the components of the hardware layer (210).

Additionally, in one or more embodiments of the invention, an application may coordinate with other components of the node (200) to establish a mapping between a virtual address space (e.g., 220, 222, 224, 226) and underlying physical components of the hardware layer (210). In one embodiment, if a mapping is established, an application's use of the virtual address space (e.g., 220, 222, 224, 226) enables the application to directly manipulate data of those physical components, without relying on other components of the node (200) to repeatedly update mappings between the virtual address space (e.g., 220, 222, 224, 226) and the physical addresses of one or more components of the hardware layer (210).

In one or more embodiments of the invention, a file system container (206) is software executing on the node (200). In one or more embodiments of the invention, a file system container (206) may be an independent software instance that executes within a larger container management software instance (not shown) (e.g., Docker®, Kubernetes®, etc.). In one embodiment, where the file system container (206) is executing as an isolated software instance, the file system container (206) may establish a semi-isolated virtual environment, inside the container, in which to execute an application (e.g., space manager (228), described below). In one embodiment of the invention, a file system container (206) may be executing in "user space" (e.g., a layer of the software that utilizes low-level system components for the execution of applications) of the OS (208).

In one embodiment of the invention, the file system container (206) includes a space manager (228). In one embodiment, a space manager (228) is software executing within the file system container (206), that may include instructions which, when executed, initiate operations of one or more components in the hardware layer (210).

In one or more embodiments of the invention, a space manager (228) may include functionality to generate one or more virtual-to-physical address mappings by translating a virtual address of a virtual address space (220, 222, 224, 226) to a physical address of a component in the hardware layer (210). Further, in one embodiment of the invention, the space manager may further be configured to communicate one or more virtual-to-physical address mappings to one or more components of the hardware layer (210) (e.g., memory management unit (240)). In one embodiments of the invention, the space manager (228) tracks and maintains virtual-to-physical address mappings through an abstraction layer(s) of virtual spaces that form a hierarchy of mappings to translate a virtual address to a physical address. In one or more embodiments of the invention, the space manager (228) is configured to maintain and utilize a hierarchy of addresses (via a sparse virtual space, one or more memory pool(s), and one or more persistent storage pool(s)) a described in FIG. 4. Additionally, in one or more embodiments of the invention, a space manager is configured to initiate the copying of data from one storage medium to another based on a determination that a storage device may be incapable of servicing an application request.

In one or more embodiments of the invention, an OS (208) is software executing on the node (200). In one embodiment of the invention, an OS (208) coordinates operations between software executing in "user space" (e.g., containers (202, 204, 206), applications (212, 214, 216, 218)) and one or more components of the hardware layer (210) to facilitate the proper use of those hardware layer (210) components. In one or more embodiments of the invention, the OS (208) includes a kernel module (230). In one embodiment of the invention, the kernel module (208) is software executing in the OS (208) that monitors data (which may include read and write requests) traversing the OS (208) and may intercept, modify, and/or otherwise alter that data based on one or more conditions. In one embodiment of the invention, the kernel module (230) is capable of redirecting data received by the OS (208) by intercepting and modifying that data to specify a recipient different than normally specified by the OS (208).

In one or more embodiments of the invention, the hardware layer (210) is a collection of physical components configured to perform the operations of the node (200) and/or otherwise execute the software of the node (200) (e.g., those of the containers (202, 204, 206), applications (212, 214, 216, 218).

In one embodiment of the invention, the hardware layer (210) includes one or more communication interface(s) (232). In one embodiment of the invention, a communication interface (232) is a hardware component that provides capabilities to interface the node (200) with one or more devices (e.g., a client, another node, a network of devices) and allow for the transmission and receipt of data with those device(s). A communication interface (232) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the hardware layer (210) includes one or more processor(s) (234). In one embodiment of the invention, a processor (234) may be an integrated circuit for processing instructions (e.g., those of the containers (202, 204, 206), applications (212, 214, 216, 218) and/or those received via a communication interface (232)). In one embodiment of the invention, processor(s) (234) may be one or more processor cores or processor micro-cores. Further, in one or more embodiments of the invention, one or more processor(s) (234) may include cache (as described in FIG. 3 below).

In one or more embodiments of the invention, the hardware layer (210) includes persistent storage (236). In one embodiment of the invention, persistent storage (236) may be one or more hardware devices capable of storing digital information (e.g., data) in a non-transitory medium. Further, in one embodiment of the invention, when accessing persistent storage (236), other components of node (200) are capable of only reading and writing data in fixed-length data segments (e.g., "blocks") that are larger than the smallest units of data normally accessible (e.g., "bytes").

Specifically, in one or more embodiments of the invention, when data is read from persistent storage (236), all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage (236).

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage (236).

Examples of "persistent storage" (236) include, but are not limited to, certain integrated circuit storage devices (e.g., solid-state drive (SSD), Non-Volatile Memory Express (NVMe) etc.), magnetic storage (e.g., hard disk drive (HDD), floppy disk, tape, diskette, etc.), or optical media (e.g., compact disc (CD), digital versatile disc (DVD), etc.).

In one or more embodiments of the invention, the hardware layer (210) includes memory (238). In one embodiment of the invention, memory (238), similar to persistent storage (236), may be one or more hardware devices capable of storing digital information (e.g., data) in a non-transitory medium. However, unlike persistent storage (236), in one or more embodiments of the invention, when accessing memory (238), other components of node (200) are capable of reading and writing data at the smallest units of data normally accessible (e.g., "bytes").

Specifically, in one or more embodiments of the invention, memory (238) may include a unique physical address for each byte stored thereon, thereby enabling software (e.g., applications (212, 214, 216, 218), containers (202, 204, 206)) to access and manipulate data stored in memory (238) by directing commands to a physical address of memory (238) that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage, "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory devices (238).

Examples of memory (238) devices include, but are not limited to, certain integrated circuit storage (e.g., flash memory, random access memory (RAM), dynamic RAM (DRAM), resistive RAM (ReRAM), etc.). Further, hybrid devices that contain multiple forms of storage (e.g., a non-volatile dual in-line memory module (NVDIMM)) may be considered "memory" if the hybrid device component that interacts with the node is capable of being accessed and/or manipulated at a "byte-level". For example, a "persistent memory" (PMem) module that includes, for example, a combination of DRAM, flash memory, and a capacitor (for persisting DRAM data to flash memory in the event of power loss) is considered "memory" as the DRAM component (the component of the module accessible by the memory management unit) is capable of being accessed and/or manipulated at a "byte-level".

In one embodiment of the invention, the hardware layer (210) includes a memory management unit (MMU) (240). In one or more embodiments of the invention, an MMU (240) is hardware configured to translate virtual addresses (e.g., those of a virtual address space (220, 222, 224, 226)) to physical addresses (e.g., those of memory (238)). In one embodiment of the invention, an MMU (240) is operatively connected to memory (238) and is the sole path to access any memory device (e.g., memory (238)) as all commands and data destined for memory (238) must first traverse the MMU (240) prior to accessing memory (238). In one or more embodiments of the invention, an MMU (240) may be configured to handle memory protection (allowing only certain applications to access memory) and provide cache control and bus arbitration. Further, in one or more embodiments of the invention, an MMU (240) may include a translation lookaside buffer (as described in FIG. 3 below).

While FIG. 2 shows a specific configuration of a node, other configurations may be used without departing from the scope of the disclosure. Accordingly, embodiments disclosed herein should not be limited to the configuration of devices and/or components shown in FIG. 2.

Figure 3:
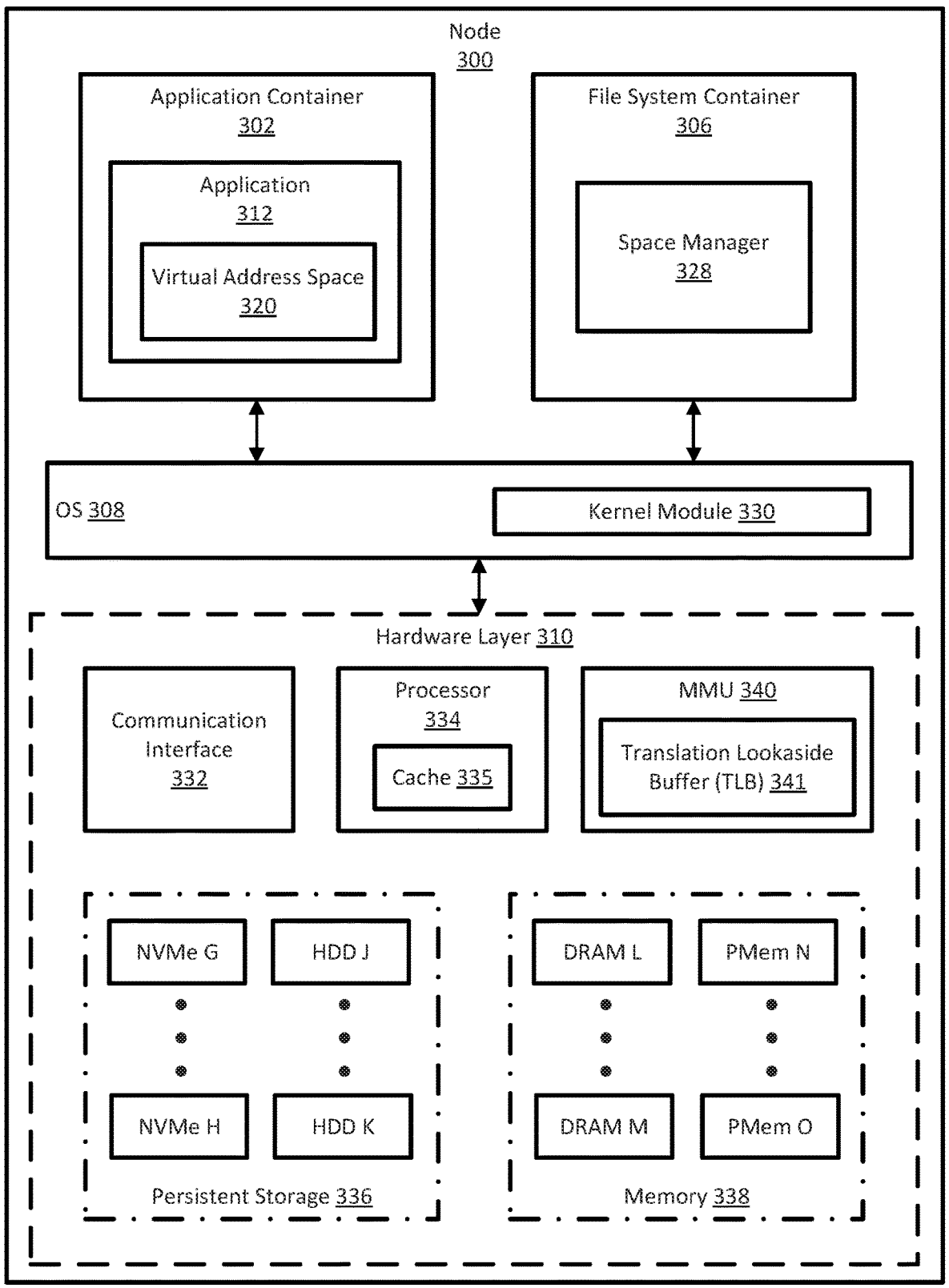
FIG. 3 shows an example of a node in accordance with one or more embodiments of the invention.

FIG. 3 shows an example of one embodiment of a node (300). In one embodiment of the invention, node (300) includes an application container (302) with application (312) and virtual address space (320), a file system container (306) with space manager (328), an OS (308) with kernel module (330), and a hardware layer (310) with communication interface (332), processor (334) with cache (335), MMU (340) with a translation lookaside buffer (TLB) (341), persistent storage (336), and memory (338). Similarly named parts shown in FIG. 3 have all of the same properties and functionalities as described above in FIG. 2. Accordingly, only additional properties and functionalities will be described below.

In one or more embodiments of the invention, processor (334) includes cache (335). In one embodiment of the invention, cache (335) may be one or more hardware devices capable of storing digital information (e.g., data) in a non-transitory medium. Cache (335) may be used internally by the processor (334) to perform operations on data, as requested by one or more software instances (e.g., application container (302), application (312), file system container (306), space manager (328), OS (308), etc.) or hardware layer components (e.g., communication interface (332), MMU (340), TLB (341), etc.).

In one or more embodiments of the invention, cache (335) is a limited resource (e.g., little total space) and may therefore reach a maximum capacity more quickly than other devices of the hardware layer (e.g., persistent storage (336) and memory (338)). However, although limited in total capacity, cache may be significantly faster at performing operations (e.g., reading, writing) than other devices of the hardware layer (e.g., persistent storage (336) and memory (338)). In one embodiment of the invention, data may only be located in cache temporarily, prior to being copied to memory (338) and/or persistent storage (336). Further data, located in cache, may be considered "uncommitted" or "dirty" until copied to memory (338) and/or persistent storage (336).

In one or more embodiments of the invention, MMU (340) includes TLB (341). In one embodiment of the invention, TLB (341) may be one or more hardware devices capable of storing digital information (e.g., data) in a non-transitory medium. Specifically, in one embodiment of the invention, the TLB (341) stores one or more virtual-to-physical address mappings which the MMU may access.

In one or more embodiments of the invention, although memory (338) may use a series of physical addresses to locate data, application (312) uses a series of virtual addresses (e.g., those of virtual address space (320)) to reference data. Accordingly, the TLB (341) provides the MMU (340) a translation table that includes one or more virtual-to-physical address mappings to identify the physical address of memory (338) associated with a virtual address (as specified by an application request). Although shown as a component of MMU (340), the TLB (341) may be located outside of the MMU (340) and inside the hardware layer (310) generally, or as part of processor (334).

In the example shown here, persistent storage (336) is shown to include one or more NVMe devices and one or more HDD devices. Similarly, in the example shown here, memory (338) is shown to include a one or more DRAM devices and one or more PMem devices. These specific instances of persistent storage devices and memory devices in FIG. 3 are shown for illustrative purposes only. One of ordinary skill in the art, having the benefit of this detailed description, would appreciate that persistent storage (336) and memory (338) may be comprised of any number of appropriate devices.

While FIG. 3 shows a specific example of a node, other configurations may be used without departing from the scope of the disclosure. Accordingly, embodiments disclosed herein should not be limited to the configuration of devices and/or components shown in FIG. 3.

Figure 4:
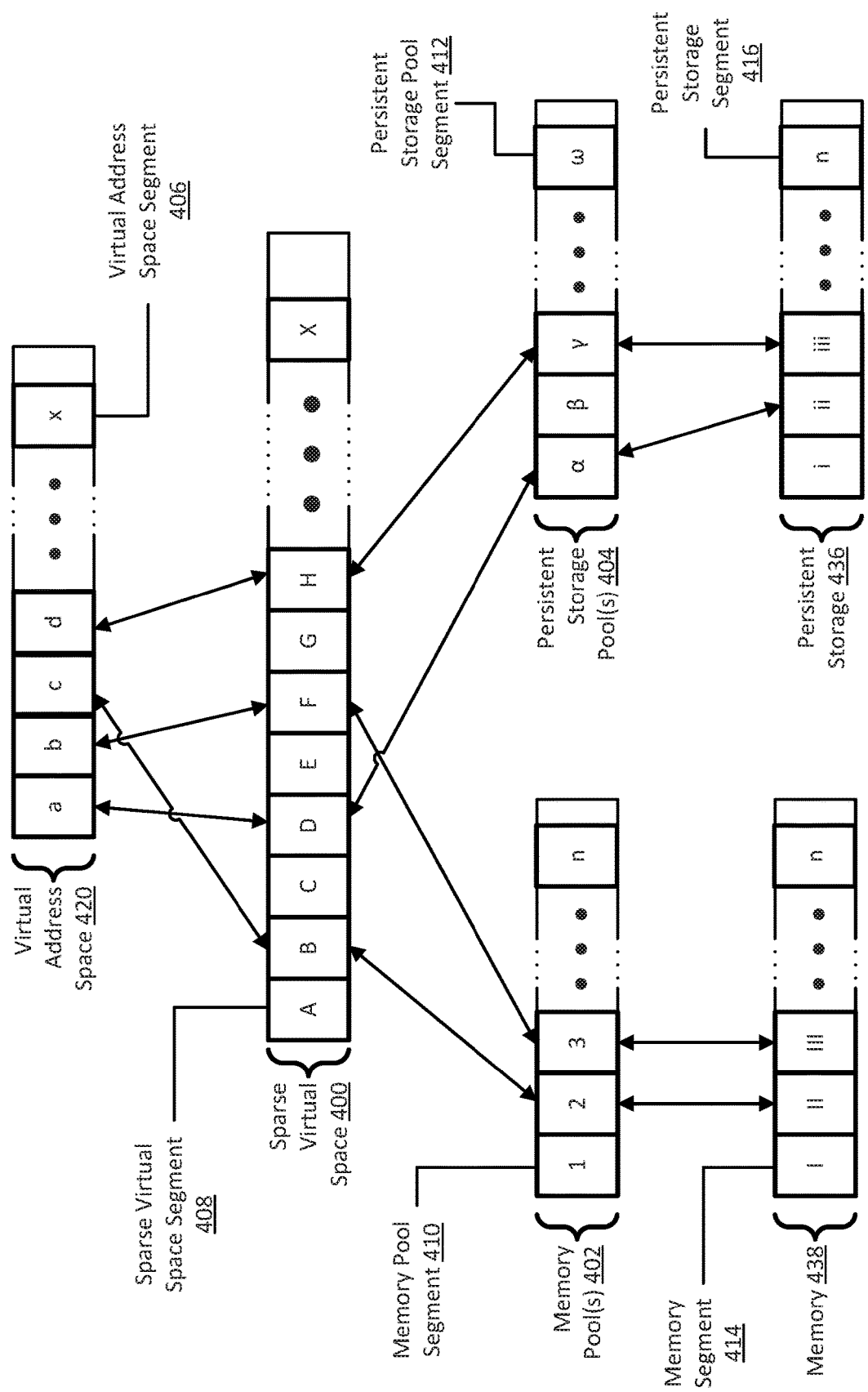
FIG. 4 shows relationships between various virtual and physical elements in the system in accordance with one or more embodiments of the invention.

FIG. 4 shows a diagram of a virtual-to-physical segment hierarchy in accordance with one or more embodiments of the invention. In one embodiment of the invention, the virtual-to-physical segment hierarchy includes a virtual address space (420), a sparse virtual space (400), one or more memory pool(s) (402), one or more persistent storage pool(s) (404), memory (438), and persistent storage (436). Each of these components is described below.

In one or more embodiments of the invention, virtual address space (420) has all of the same properties and functionalities as the virtual address space(s) described above in FIG. 1. Additionally, in one embodiment of the invention, a virtual address space (e.g., virtual address space (420)) may include one or more virtual address space segment(s) (e.g., virtual address space segment (406)). In one or more embodiments of the invention, a virtual address space segment (406) may correspond to some other smaller portion of the virtual address space (420) (e.g., a subset of virtual addresses). In one embodiment of the invention, virtual address space segment (406) may be associated with a single virtual address (as described in FIG. 1). In one or more embodiments of the invention, a virtual address space address segment (406) is mapped to a sparse virtual space segment (408) (described below). In one embodiment of the invention, every virtual address space segment (e.g., virtual address space segment (404)) is individually and uniquely mapped to a unique sparse virtual space segment (e.g., sparse virtual space segment (408)).

In one or more embodiments of the invention, sparse virtual space (400) is a sparse, virtual data structure that provides a comprehensive layout and mapping of data managed by the file system container of the node. In one embodiment of the invention, the sparse virtual space (400) spans the entire virtual-to-physical segment hierarchy, such that every adjacent layer in in the virtual-to-physical segment hierarchy maps to the sparse virtual space (400). That is, while there may be multiple virtual address space(s) (e.g., virtual address space (420), others not shown) and there may be multiple pool(s) for storage (e.g., memory pool(s) (402), persistent storage pool(s) (404)), there is only one sparse virtual space (400).

Further, as the sparse virtual space (400) may need to be continually updated to allow for new internal associations with adjacent layers, the sparse virtual space (400) may be initially allocated substantially sparse enough to be able to handle new associations without having to allocate additional space outside of that initially reserved. Accordingly, for example, the sparse virtual space may be allocated with several petabytes of sparse space, with the intention being that the physical memory and persistent storage (associated with the sparse virtual space) will not exceed several petabytes of physical storage space.

In one or more embodiments of the invention, the sparse virtual space (400) may include one or more sparse virtual space segment(s) (e.g., sparse virtual space segment (408)). In one embodiment of the invention, a sparse virtual space segment (408) is a smaller virtual sub-region of the sparse virtual space (400) that is uniquely associated with some data. In one or more embodiments of the invention, a sparse virtual space segment (408) may provide the logical volume and logical volume offset for data (physically located in the persistent storage and/or memory of the node).

In one or more embodiments of the invention, each sparse virtual space segment (e.g., sparse virtual space segment (408)) is uniquely associated with a unique memory pool segment (410) or a unique persistent storage pool segment (412), as explained below.

In one or more embodiments of the invention, each sparse virtual space segment (408) may be uniformly sized throughout the sparse virtual space (400). In one or more embodiments of the invention, each sparse virtual space segment (408) may be equal to the largest memory pool segment (410) or persistent storage pool segment (412) associated with the sparse virtual space (e.g., the largest block of a persistent storage device). Alternatively, in one or more embodiments of the invention, each sparse virtual space segment (408) may be allocated to be sufficiently larger than any current and future individual memory pool segment (410) and/or persistent storage pool segment (412) (e.g., larger than a persistent storage block).

In one or more embodiments of the invention, memory pool(s) (402) are virtual data spaces that identify physical regions of a portion of, one, or several memory devices (e.g., memory (438)) of the hardware layer. Memory pool(s) (402) may identify physical regions of memory by maintaining a virtual mapping to the physical addresses of data that comprise those memory devices (e.g., memory (438)).

In one or more embodiments of the invention, several memory pools (402) may concurrently exist, each of which is independently mapped to part of, one, or several memory devices (e.g., memory (438)). Alternatively, in one embodiment of the invention, there may only be a single memory pool (402) associated with the physical regions of data of all memory devices (e.g., memory (438)) in a node.

In one embodiment of the invention, a single memory pool (of memory pool(s) (402)) may be uniquely associated with a single memory device. Accordingly, a single memory pool may provide a one-to-one virtual emulation of a single memory device of the hardware layer. Alternatively, in one or more embodiments of the invention, a single memory pool may be associated with multiple memory devices, each sharing some characteristic. For example, there may be a single memory pool for two or more DRAM devices and a second memory pool for two or more PMem devices. One of ordinary skill in the art, having the benefit of this detailed description, would appreciate that memory pool(s) (402) may be organized by any suitable characteristic of the underlying memory (e.g., based on individual size, collective size, type, speed, etc.).

In one or more embodiments of the invention, memory pool(s) (402) include one or more memory pool segment(s) (e.g., memory pool segment (410)). In one embodiment of the invention, a memory pool segment (410) is a smaller sub-region of a memory pool (402) that is uniquely associated with some data located in memory (438). Further, one or more memory pool segment(s) (410) may be uniquely associated with one or more unique regions of a memory device (e.g., memory segment (414)). For example, memory pool segment (410) may be associated with a physical address range on a memory device (e.g., memory (438)) that corresponds to the physical location of a single byte of data (as explained below).

In one or more embodiments of the invention, memory (438) has all of the same properties and functionalities as the memory described in FIG. 1 above. Additionally, as disclosed in FIG. 4, memory (438) may include one or more memory segment(s) (e.g., memory segment (414)) that divide memory (438) in smaller sub-regions. In one or more embodiments of the invention, a memory segment (414) is a unique physical region of the memory (438) that stores data and is accessible using a physical address.

In one or more embodiments of the invention, as shown in FIG. 4, two or more contiguous memory pool segments (410) are associated with two or more contiguous memory segments (414), respectively. Accordingly, there may be a sequential mapping between memory (438) and a memory pool (402) such that by referencing a sequence of memory pool segments (e.g., "1", "2", "3" of memory pool(s) (402)), a corresponding sequence of memory segments (e.g., "I", "II", "III" of memory (438)) will be accessed. Further, when a direct mapping between a memory pool (402) and memory (438) is maintained, the memory pool, alone, provides an accurate, direct, and sequential representation of the underlying memory (e.g., total space, data location, available space, etc.). Alternatively, in one embodiment of the invention, a series of memory pool segment(s) (410) are not consecutively associated with a series of memory segment(s) (414) (not shown).

In one or more embodiments of the invention, persistent storage pool(s) (404) are virtual data spaces that identify regions of a portion of, one, or several persistent storage devices (e.g., persistent storage (436)) of the hardware layer. Persistent storage pool(s) (404) may identify physical regions of persistent storage by maintaining a virtual mapping to the physical location of data that comprise those persistent storage devices (e.g., persistent storage (436)).

In one or more embodiments of the invention, several persistent storage pools (404) may concurrently exist, each of which is independently mapped to part of, one, or several persistent storage devices (e.g., persistent storage (436)). Alternatively, in one embodiment of the invention, there may only be a single persistent storage pool (404) associated with the physical locations of data on all persistent storage devices (e.g., persistent storage (438)) in a node.

In one embodiment of the invention, a single persistent storage pool (of persistent storage pool(s) (404)) may be uniquely associated with a single persistent storage device. Accordingly, a single persistent storage pool may provide a one-to-one virtual emulation of a single persistent storage device of the hardware layer. Alternatively, in one or more embodiments of the invention, a single persistent storage pool may be associated with multiple persistent storage devices, each sharing some characteristic. For example, there may be a first persistent storage pool for two or more NVMe devices and a second persistent storage pool for two or more SSD devices. One of ordinary skill in the art, having the benefit of this detailed description, would appreciate that persistent storage pool(s) (404) may be organized by any suitable characteristic of the underlying persistent storage (e.g., based on individual size, collective size, type, speed, etc.).

In one or more embodiments of the invention, persistent storage pool(s) (404) include one or more persistent storage pool segment(s) (e.g., persistent storage pool segment (412)). In one embodiment of the invention, a persistent storage pool segment (412) is a smaller sub-region of a persistent storage pool (404) that is uniquely associated with some data located in persistent storage (436). Further, one or more persistent storage pool segment(s) (412) may be uniquely associated with one or more unique regions of a persistent storage device (e.g., persistent storage segment (416)).

In one or more embodiments of the invention, persistent storage (436) has all of the same properties and functionalities as the persistent storage described in FIG. 1 above. Additionally, as disclosed in FIG. 4, persistent storage (436) may include one or more persistent storage segment(s) (e.g., persistent storage segment (416)) that divide persistent storage (436) in smaller sub-regions. In one or more embodiments of the invention, a persistent storage segment (416) is a unique physical region of persistent storage (436) that stores data and is accessible using a physical address.

In one or more embodiments of the invention, as shown in FIG. 4, two or more contiguous persistent storage pool segments (412) are not associated with two or more contiguous persistent storage segments (416). Accordingly, there may be a non-sequential mapping between persistent storage (436) and a persistent storage pool (404) such that by referencing a non-sequential series of persistent storage pool segments (e.g., "α", "γ", of persistent storage pool(s) (404)), a corresponding sequential or non-sequential series of persistent storage segments (e.g., "ii", "iii" of persistent storage (436)) will be accessed. Alternatively, in one embodiment of the invention, like memory pool(s) (402) and memory (438), there may be a corresponding sequential association of segments between the persistent storage pool segments (412) and persistent storage segments (416) (not shown).

Accordingly, in one embodiment of the invention, the virtual-to-physical segment hierarchy of FIG. 4 provides a mapping from a virtual address space segment (406) of an application to a physical location of the hardware (memory segment (414) or persistent storage segment (416)).

As an example, virtual address space (420) may correspond to a single file being accessed by the application where each virtual address space segment ("a", "b", "c", and "d") represent four bytes of that file. In order for the application to access those four bytes, the space manager locates, in the sparse virtual space, the unique sparse virtual space segments that are associated with those four bytes ("D", "F", "B", and "H", respectively). In turn, two of those sparse virtual space segments ("B" and "F") are mapped to two memory pool segments ("2" and "3", respectively); while the other two sparse virtual space segments ("D" and "H") are mapped to two persistent pool segments ("α" and "γ", respectively). As the memory pool (402) maintains a one-to-one sequential mapping to memory (438), the two memory pool segments, "2" and "3", directly correspond to memory segments "II" and "III". For persistent storage pool (404), however, a sequential mapping to persistent storage (436) is not maintained, and the two persistent pool segments, "α" and "γ", are associated with persistent storage segments "ii" and "iii", respectively. Accordingly, the original segments of data ("a", "b", "c", and "d") may be translated to the physical locations of each segment ("ii", "III", "II", and "ii", respectively) using the virtual-to-physical segment hierarchy.

While FIG. 4 shows a specific configuration of a virtual-to-physical segment hierarchy, other configurations may be used without departing from the scope of the disclosure. For instance, as discussed above, there may be many virtual address spaces of several applications that may access the sparse virtual space to identify the physical location of data. Further, there can be any number of memory pools and/or persistent storage pools mapping into the sparse virtual space. Similarly, the memory pools and persistent storage pools may be mapped into any number of memory and persistent storage devices, respectively. Accordingly, embodiments disclosed herein should not be limited to the configuration of devices and/or components shown in FIG. 4.

Figure 5:
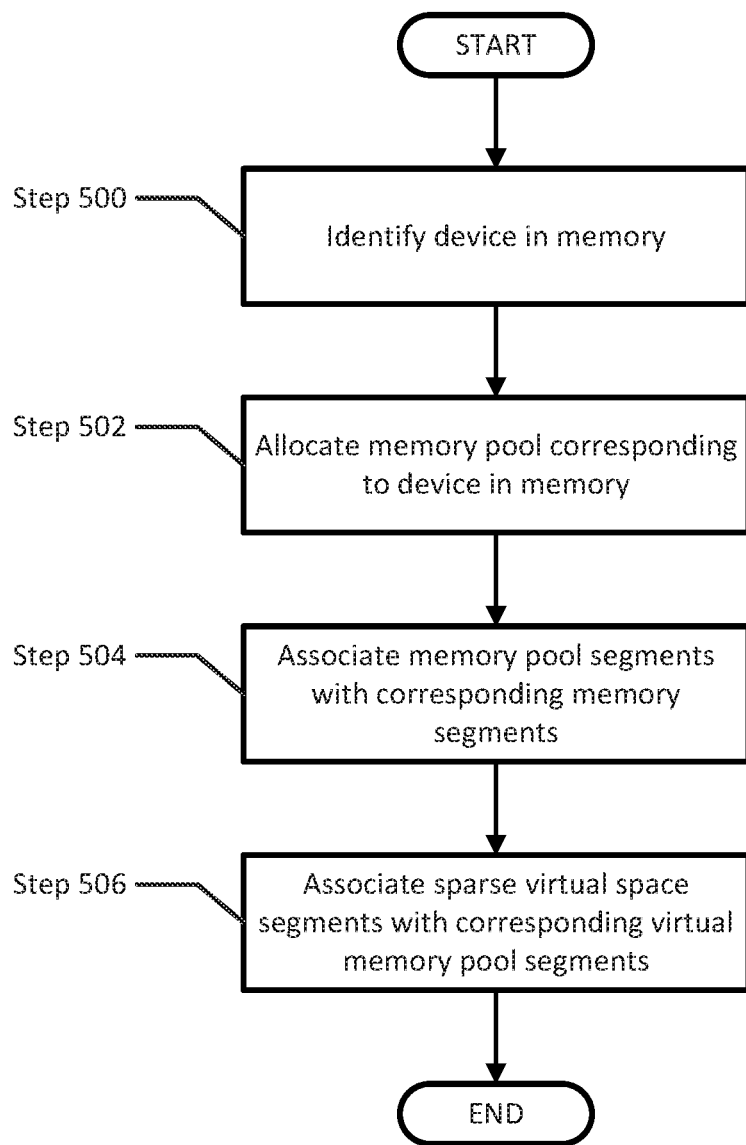
FIG. 5 shows a flowchart of a method of configuring the system in accordance with one or more embodiments of the invention.

FIG. 5 shows a flowchart of a method of creating a memory pool and a sparse virtual space, in accordance with one or more embodiments of the invention. All or a portion of the method shown in FIG. 5 may be performed by the space manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a space manager identifies one or more memory devices to which the node has access. In one or more embodiments of the invention, the selection of memory devices may be based on connectivity (i.e., if an operative connection to the memory devices exists), permissions to access the memory device, physical location (e.g., located within the node, or accessible through a communication interface), and/or other management roles (e.g., file system ownership). Further, some portion of a single memory device may be available to a space manager, while another portion of that same memory device will be inaccessible based on one or more of the aforementioned characteristics.

In one or more embodiments of the invention, a space manager will be caused to identify all memory devices to which the node has access (Step 500) based on one or more conditions including, for example, the node being initially configured, a change in the hardware being detected, user instruction, and/or other any other event that would cause the space manager to need to establish (or otherwise update) a sparse virtual space and memory pools.

In Step 502, the space manager allocates one or more memory pools corresponding to the one or more memory devices identified in Step 500. Specifically, as discussed above with respect to FIG. 4, memory pools may be created and/or organized based on any suitable characteristic of the underlying memory (e.g., individual size, collective size, type, speed, etc.). For example, if two DRAM devices and one PMem are identified in Step 500, the space manager may create two memory pools, one memory pool for both DRAM devices, and one memory pool for the PMem device.

Further, in one embodiment of the invention, the memory pool(s) created by the space manager are created to correspond to the size of the underlying memory. For example, if the first DRAM device is 1,000 Mb, the second DRAM device is 1,500 Mb, and the PMem device is 2,000 Mb, the first memory pool (associated with the DRAM) will need to be at least 2,500 Mb of virtual space whereas the second memory pool will need to be at least 2,000 Mb of virtual space.

Continuing with the example, if a first memory pool corresponds to two DRAM devices, the space manager may associate a first portion of the memory pool to the first DRAM device and a second portion of the memory pool to the second DRAM device. Then, assuming the same sizes described above, the first memory pool (associated with the DRAM devices) is divided into two portions, 1,000 Mb for the first portion, 1,500 Mb for the second portion. Further, as the second memory pool is only associated with a single PMem device, there is no need to allocate a device-level portion in the second memory pool.

In Step 504, the space manager partitions the memory pool(s) into an appropriate number of memory pool segments corresponding to the memory devices identified in Step 500. The size of each of the memory pool segments may be determined by the space manager and/or based on the underlying characteristics of the memory devices.

In one or more embodiments of the invention, each memory pool is divided into the number of segments equal to the number of bytes accessible on that memory device (e.g., memory segments). Continuing with the example above, the first region of the first memory pool (associated with the 1,000 Mb DRAM device) is partitioned into 1,000 segments. The second region of the first memory pool (associated with the 1,500 Mb DRAM device) is partitioned into 1,500 segments. And, finally, the second memory pool (associated with the 2,000 Mb PMem device) is partitioned into 2,000 segments, corresponding to the 2,000 Mb of that PMem device.

In one or more embodiments of the invention, once each memory pool is partitioned into memory pool segments, each memory pool segment is associated with a corresponding memory segment. Thus, for example, the first memory segment of the first DRAM device is associated with the first memory pool segment of the first memory pool associated with DRAM device. Then, for each sequential addressable region of the memory device, the same association may be established with corresponding memory pool segment.

In Step 506, each memory pool segment is associated with a unique sparse virtual space segment. In one or more embodiments of the invention, in the event that the sparse virtual space does not yet exist, the space manager allocates a sufficiently large region of virtual space to allow for associations to all existing and future memory devices. As described above for FIG. 4, the sparse virtual space may be allocated with several petabytes of sparse space, with the intention being that the physical memory and persistent storage (associated with the sparse virtual space) will not exceed several petabytes of physical storage space.

In one or more embodiments of the invention, after the creation of the sparse virtual space, the space manager divides the entire sparse virtual space into uniformly sized segments. As described above for FIG. 4, in one or more embodiments of the invention, each sparse virtual space segment may be allocated to be sufficiently larger than any current and future individual memory pool segment and/or persistent storage pool segment (e.g., larger than a persistent storage block).

In one or more embodiments of the invention, once the sparse virtual space is partitioned into a very large number of sparse virtual space segments, each memory pool segment (created in Step 504) is associated with one of the sparse virtual space segments. In one embodiment of the invention, the sparse virtual space segments, associated with the memory pool segments, are scattered throughout the sparse virtual space with no particular ordering. Alternatively, in one embodiment of the invention, the sparse virtual space segments associated with memory segments are grouped consecutively, or in multiple consecutive sequences throughout the sparse virtual space.

Continuing with the example above, the 3,500 memory pool segments created across the two memory pools would then be associated with 3,500 sparse virtual space segments. In one embodiment of the invention, the sparse virtual space segments associated with the memory pool segments may be spread throughout the sparse virtual space, without any forced order or general organization.

Alternatively, in one or more embodiments of the invention, the space manager will not, initially, associate any sparse virtual space segments with the memory pool segments. Instead, for example, if the memory devices contain no data, the space manager may wait until a write request is received before associating one or more sparse virtual space segments with one or more memory pool segments.

Further, while Steps 500-506 only explain the process in relation to memory and memory devices, this same process may also apply to persistent storage, albeit modified, where necessary, to conform with the differences between memory and persistent storage, as discussed in FIGS. 2 and 4.

FIG. 6A shows a flowchart of a method for writing new data to memory of the node, in accordance with one or more embodiments of the invention. All or a portion of the method shown in FIG. 6A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 600, an application issues a write request to store new data in the virtual address space of that application. In one or more embodiments of the invention, the write request specifies the virtual address space segment (e.g., virtual address) and the data to be written. Further, in one embodiment of the invention, as the data is new, there is no known physical location to store the data when initially generated, and therefore a location must be newly identified.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 602, the application container, to which the application belongs, forwards the write request to the OS. In one or more embodiments of the invention, although the application issued the write request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operation of the node.

In Step 604, the hardware layer of the node issues of page fault to the OS. In one or more embodiments of the invention, a page fault is an exception handling process of the OS caused by one or more components of the hardware layer receiving an invalid request.

In one embodiment of the invention, a page fault is issued by a processor when an invalid reference is provided to an MMU. Specifically, when a request to access or modify memory is sent to the MMU, using a virtual address, the MMU may perform a lookup in the TLB to find a physical address associated with the provided virtual address (e.g., a virtual-to-physical address mapping). However, if the TLB does not provide a physical address associated with the virtual address (e.g., due to the TLB lacking the appropriate virtual-to-physical address mapping), the MMU will be unable to perform the requested operation. Accordingly, the MMU informs the processor that the request cannot be serviced, and in turn, the processor issues a page fault back to the OS informing that the request could not be serviced.

In one or more embodiments of the invention, the page fault specifies the original write request (i.e., the data to be written and the virtual address) and the reason for the page fault (that the MMU could not locate the virtual-to-physical address mapping).

In Step 606, the kernel module of the OS intercepts the page fault and forwards the page fault (and the associated write request) to the file system container of the node. In one embodiment of the invention, the kernel module may forward only the write request, as initially generated by the application, to the file system container.

In one or more embodiments of the invention, as described in FIG. 1 above, the kernel module is software executing in the OS that monitors data traversing the OS and may intercept, modify, and/or otherwise alter that data based on one or more conditions. In one embodiment of the invention, the kernel module is capable of redirecting data received by the OS by intercepting and modifying that data to specify a recipient different than normally specified by the OS.

In one or more embodiments of the invention, the OS will, initially, be configured to forward the page fault to the application from which the request originated. However, in one embodiment of the invention, the kernel module detects the OS received a page fault, and instead forwards the page fault to a different location (i.e., the file system container) instead of the default recipient (i.e., the application container and/or application). In one embodiment of the invention, the kernel module specifically monitors for and detects exception handling processes that specify an application's inability to access the physical location of data.

In Step 608, the file system container, having received and processed the page fault forwarded by the kernel module, informs the OS of the proper virtual-to-physical address mapping for the write request. More details of the process of Step 608 are discussed in relation to FIG. 6B below.

In Step 610, the OS initiates writing of the requested data to the hardware layer of the node. In one or more embodiments of the invention, the write request, initially generated by the application, is serviced by storing, in memory, the requested data.

Specifically, in one or more embodiments of the invention, after receiving the virtual-to-physical address mapping from the file system container in Step 608, the OS informs the hardware layer (the MMU, specifically) of the virtual-to-physical address mapping. In turn, the MMU creates an entry in the TLB that associates the virtual address (of the application's virtual address space) to the physical address specified by the file system container. Accordingly, when the MMU receives any additional requests specifying that same virtual address, the MMU will then be able to locate the associated physical address in the TLB (and therefore avoid issuing a page fault).

Thus, in one or more embodiments of the invention, after the TLB includes the appropriate virtual-to-physical address mapping, the OS reissues and/or forwards the initial write request back to hardware layer of the node. Then, as the hardware layer is now configured to service the request, the data is written to the physical address specified in the TLB (as identified by the file system container).

FIG. 6B shows a flowchart of a method for identifying a physical location to store new data, in accordance with one or more embodiments of the invention. All or a portion of the method shown in FIG. 6B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 612, the file system container receives a write request to store new data. As discussed above in Step 606, the file system container may receive a page fault (containing the write request) or the write request, alone, from a kernel module of the node. In one or more embodiments of the invention, the space manager of the file system container, performs the processing of the write request.

In Step 614, the space manager identifies one or more available sparse virtual space segments for the new data. In one or more embodiments of the invention, as described in Step 506 above, the space manager may have already allocated and associated every sparse virtual space segment with every available memory pool segment. However, in one or more embodiments of the invention, the space manager may not associate sparse virtual space segments with memory pool segments until receiving a write request.

In turn, in one or more embodiments of the invention, the space manager identifies one or more sparse virtual space segments sufficiently large enough (e.g., containing sufficient free space) to service the write request. If not already associated with memory pool segments, the space manager identifies one or more memory pool segments sufficiently large enough (e.g., containing sufficient free space) to service the write request and associate those memory pool segments with available sparse virtual space segments.

In one or more embodiments of the invention, once the one or more memory pool segments are identified, the associated one or more memory segments are identified based on a prior established mapping (see e.g., FIGS. 4-5).

In Step 616, the file system container informs the OS of the virtual-to-physical address mapping. In one or more embodiments of the invention, once a physical address of the memory is known, the space manager generates a virtual-to-physical address mapping using the virtual address received with the write request and the physical address identified in the memory pool.

In one or more embodiments of the invention, once the virtual-to-physical address mapping is generated, the space manager initiates the transmission of the virtual-to-physical address mapping to the OS (to ultimately inform the MMU). As the space manager may be an isolated software instance executing within the file system container, the file system container may be the software instance that directly forwards the mapping to the OS.

In one or more embodiments of the invention, the file system container may also re-forward the write request back to the OS for servicing. Alternatively, in one embodiment of the invention, the OS may have temporarily stored the write request, while the file system container generated and provided the virtual-to-physical address mapping, so that the write request could be resent upon the receipt of the corresponding virtual-to-physical address mapping.

Figure 7A:
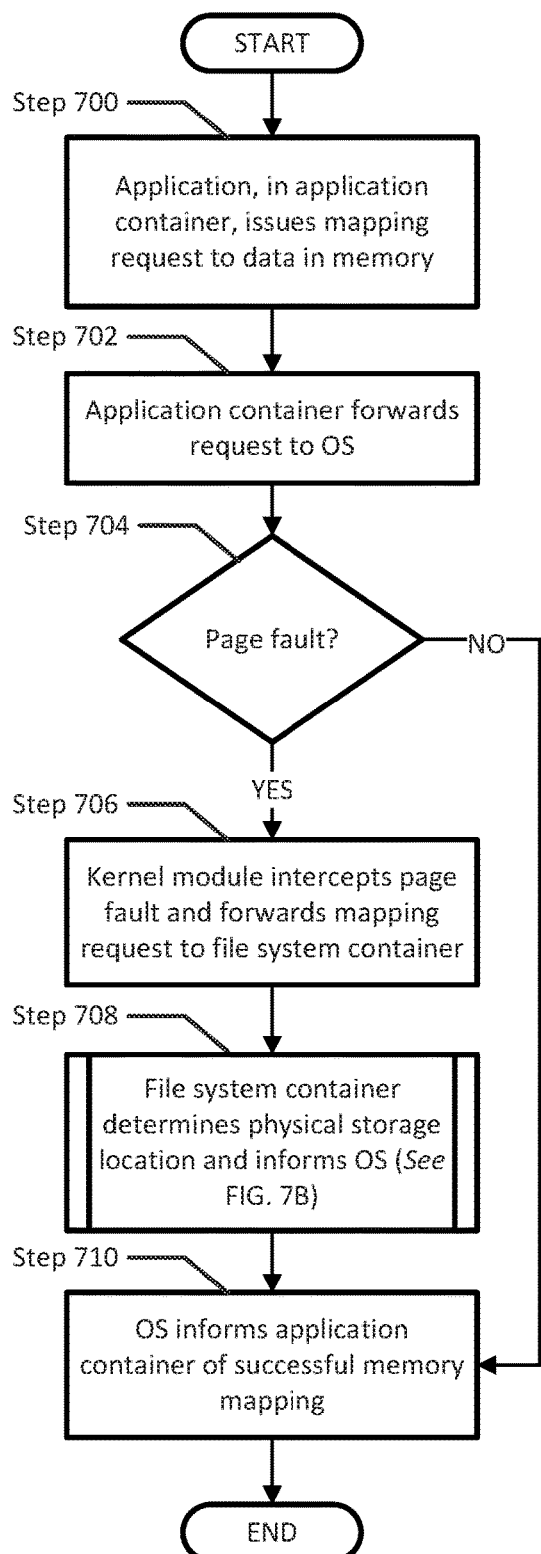
FIG. 7A shows a flowchart of a method of generating and servicing a read request in accordance with one or more embodiments of the invention.

FIG. 7A shows a flowchart of a method for establishing direct access to memory of the hardware layer of the node via a virtual-to-physical address mapping, in accordance with one or more embodiments of the invention. All or a portion of the method shown in FIG. 7A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 700, an application issues a mapping request for data in the virtual address space of that application. In one or more embodiments of the invention, the mapping request specifies the virtual address space segment (e.g., virtual address) of the virtual address space. In one or more embodiments of the invention, the mapping request specifies the data using a file identifier and a file offset. Further, in one embodiment of the invention, as the data being directly accessed already exists, it is assumed the physical location of the data is identifiable.

In one or more embodiments of the invention, a mapping request is a request to establish a one-to-one mapping between one or more virtual address space segments and one or more memory segments (e.g., one or more virtual-to-physical address mappings that directly correlate application virtual memory address(es) to physical memory address(es)). Further, in one embodiment of the invention, as mapping to a region of memory requires that data to be located on a byte-addressable device (i.e., memory), it is therefore not possible to establish a direct mapping to data physically stored in persistent storage. That is, persistent storage is not configured to support, and is therefore not suitable for, servicing mapping requests, and the requested data will therefore need to be relocated to a suitable device in order to establish the requested direct access mapping (as discussed in relation to FIG. 7B below)

In one or more embodiments of the invention, as described in FIG. 1 above, the application may be executing within an application container that has the ability to access the OS of the node. Thus, when an application, isolated in an application container, issues a mapping request to an internal virtual address space, the application container handles that command before interacting with the OS.

In Step 702, the application container, to which the application belongs, forwards the mapping request to the OS. In one or more embodiments of the invention, although the application issued the mapping request to the virtual address space of the application, such internal requests ultimately trigger external commands to the underlying OS so that the request to the virtual address space may be serviced by the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 704, a determination is made as to whether a page fault is issued by the hardware layer of the node. In one or more embodiments of the invention, the virtual address specified by the mapping request will already be mapped to a physical address in the TLB with a virtual-to-physical address mapping. However, if the TLB lacks an entry associating the virtual address to any physical address, the hardware layer issues a page fault as described in Step 604 above. If a page fault is not issued (704-NO), the process proceeds to Step 710. Alternatively, if a page fault is issued (704-YES), the process proceeds to Step 706. In one or more embodiments of the invention, the page fault may include the initial mapping request and an indication that the virtual-to-physical address mapping does not exist in the TLB.

In Step 706, the kernel module intercepts and forwards the page fault to the file system container. In one or more embodiments of the invention, as described in Step 606 above, the OS is initially configured to forward the page fault to the application from which the request originally initiated. However, in one embodiment of the invention, the kernel module detects the OS received a page fault, and instead forwards the page fault to a different location (i.e., the file system container) instead of the default recipient (i.e., the application container and/or application). In one embodiment of the invention, the kernel module specifically monitors for and detects exception handling processes that specify an application's inability to access the physical location of data.

In Step 708, the file system container, having received and processed the page fault forwarded by the kernel module, informs the OS of the proper virtual-to-physical address mapping for the write request. More details of the process of Step 708 are discussed in relation to FIG. 7B below.

In Step 710, the OS informs the application that a memory mapping has been established. In one or more embodiments of the invention, the mapping request, initially generated by the application, is serviced by informing the MMU (and TLB) of the virtual-to-physical address mapping associated with the virtual address specified by the application.

Specifically, in one or more embodiments of the invention, after receiving the virtual-to-physical address mapping from the file system container in Step 708, the OS informs the hardware layer (the MMU, specifically) of the virtual-to-physical address mapping. In turn, the MMU creates an entry in the TLB that associates the virtual address (initially specified by the application) to the physical address specified by the file system container. Accordingly, when the MMU receives any additional requests specifying that same virtual address, the MMU will then be able to locate the associated physical address in the TLB (and therefore avoid issuing a page fault).

Thus, in one or more embodiments of the invention, after the TLB includes the appropriate virtual-to-physical address mapping, the OS informs the application of the successful memory mapping. Accordingly, the hardware layer of the node is then configured to directly service any request referencing that virtual address. More detail on the direct access to hardware layer components is discussed in FIGS. 8A and 8B below.

Figure 7B:
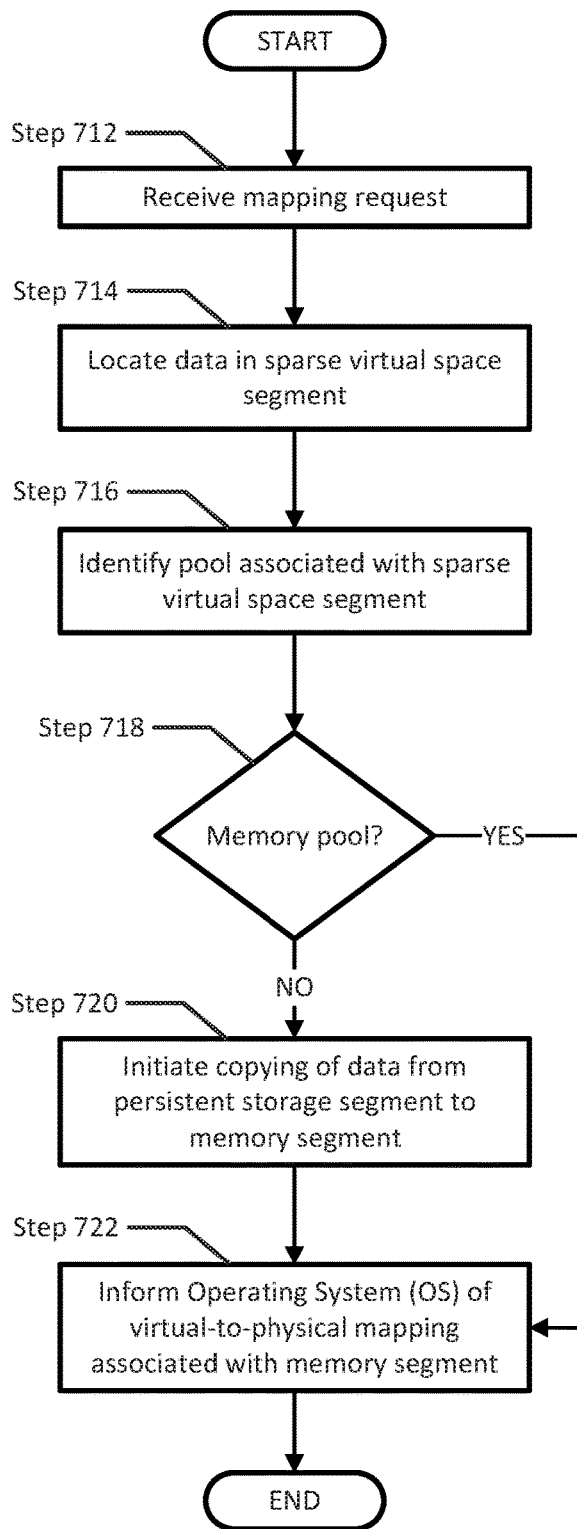
FIG. 7B shows a flowchart of a method of servicing a mapping request in accordance with one or more embodiments of the invention.

FIG. 7B shows a flowchart of a method for identifying a physical location that satisfies the mapping request, in accordance with one or more embodiments of the invention. All or a portion of the method shown in FIG. 7B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 712, the file system container receives a mapping request to data located in memory. As discussed above in Step 706, the file system container may receive a page fault (including the mapping request) or the mapping request, alone, from a kernel module of the node. In one or more embodiments of the invention, the space manager of the file system container processes the mapping request.

In Step 714, the space manager identifies one or more sparse virtual space segments associated with the requested data. In one or more embodiments of the invention, as discussed in Step 700 above, the mapping request specifies the data using a file identifier and a file offset.

In one or more embodiments of the invention, the space manager uses the file identifier to identify a logical volume and a logical volume offset, within that logical volume, associated with file identifier. Once the logical volume offset is known, the sparse virtual space segment(s) associated with that file are similarly identified. Further, using the specified file offset, one or more sparse virtual space segments are identified and located that are specific to the data specified in the received mapping request. Accordingly, at this point, the space manager has located, in the sparse virtual space, the data specified in the mapping request.

In Step 716, the space manager identifies the pools mapped to the one or more sparse virtual space segments identified in Step 714. Further, in one or more embodiments of the invention, as the pools are categorized into two categories, memory pool(s) and persistent storage pool(s), the storage type of the requested data is similarly identifiable.

In Step 718, the space manager determines the storage type of the device on which the requested data is located. As discussed in Step 716 above, in one embodiment of the invention, identifying the pool associated with the sparse virtual space segment is sufficient to determine the storage type of the device, as each pool is unique to the two types of storage (persistent storage and memory).

In one or more embodiments of the invention, mapping to a region of memory requires that data to be located on a byte-addressable device (i.e., memory). Accordingly, it is therefore not possible to establish a direct mapping to data physically located in persistent storage (stored in blocks). That is, persistent storage is not configured to support, and is therefore not suitable for, servicing mapping requests.

Accordingly, if the specified data of the mapping request is located in persistent storage, the requested data is relocated to a suitable device in order to establish the direct mapping. However, if the data is already located on a device that is suitable for direct memory mapping (i.e., memory), the current location of that data is therefore sufficient to service the request, without first moving the data.

If the requested data is located in persistent storage (718-NO), the process proceeds to Step 720. Alternatively, if the requested data is located in memory (718-YES), the process proceeds to Step 722.

In Step 720, the file system container initiates copying the data from persistent storage to memory. Specifically, in one or more embodiments of the invention, the space manager identifies the physical location of the requested data using the persistent storage pool(s). As described in FIG. 4 above, each identified persistent storage pool segment is associated with persistent storage segments that identify the physical locations of the requested data.

In one or more embodiments of the invention, once the physical location of the requested data is known, the space manager identifies available locations of memory to relocate the data. Specifically, the space manager may analyze one or more memory pools and/or the sparse virtual space to located regions of physical memory that are available (e.g., includes sufficient free space) to copy to the requested data. The exact type of memory chosen to relocate the data is irrelevant, in one or more embodiments of the invention, the only relevant characteristic of the new memory device is that byte-level manipulation be possible, thereby allowing for direct virtual-to-physical address mapping.

In one or more embodiments of the invention, once the physical location of the requested data and the physical location of available memory are known, the space manager generates a copy command to copy the data from the data's location in persistent storage to the new location in memory. Further, in one embodiment of the invention, as the requested data is stored in blocks in persistent storage, every block that includes the requested data will have to be copied, even though those blocks may contain other, non-requested data. However, the copy command issued by the space manager ensures only the requested data is copied to memory, and not all of the data from each entire block identified in persistent storage.

Accordingly, in one or more embodiments of the invention, once the copy command is generated by the space manager, the file system container forwards that command to the OS to initiate copying of the data from persistent storage to memory.

In Step 722, the file system container informs the OS of the virtual-to-physical address mapping. In one or more embodiments of the invention, once a physical address of the memory is known, the space manager generates a virtualto-physical address mapping using the virtual address received with the mapping request and the physical address identified in the memory pool.

In one or more embodiments of the invention, once the virtual-to-physical address mapping is generated, the space manager initiates sending the virtual-to-physical address mapping to the OS (to ultimately inform the MMU).

Figure 8A:
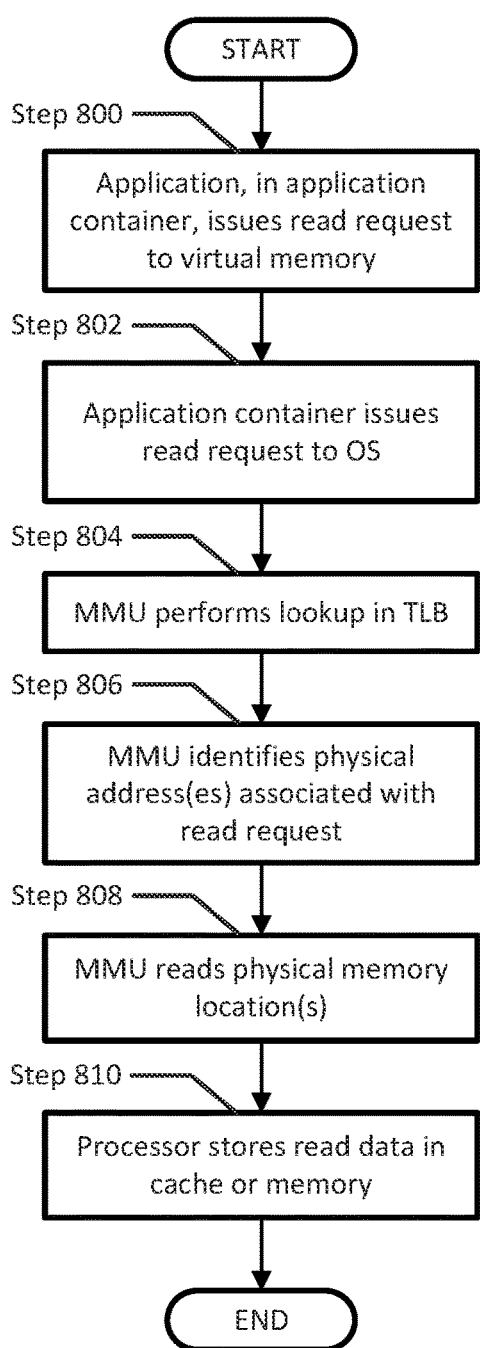
FIG. 8A shows a flowchart of a method of directly reading data in accordance with one or more embodiments of the invention.

FIG. 8A shows a flowchart of a method for directly accessing a region of memory, in accordance with one or more embodiments of the invention. All or a portion of the method shown in FIG. 8A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 800, an application issues a read request to the virtual address space of that application. In one or more embodiments of the invention, the read request specifies the virtual address space segment (e.g., virtual address) of the virtual address space. Further, in one embodiment of the invention, the application is aware that a memory mapping exists for the virtual address space segments being utilized.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 802, the application container, to which the application belongs, forwards the read request to the OS. In one or more embodiments of the invention, although the application issued the read request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 804, the MMU of the hardware layer performs a lookup in the TLB to identify a physical address associated with the specified virtual address. In one or more embodiments of the invention, as described above in Step 604, when a request to access or modify memory is sent to the MMU, using a virtual address, the MMU may perform a lookup in the TLB to find a physical address associated with the provided virtual address (e.g., a virtual-to-physical address mapping).

In Step 806, the MMU identifies the physical address(es) associated with the virtual address of the read request. Specifically, in one embodiment of the invention, where the application had already established a direct mapping (e.g., the process of FIGS. 7A and 7B), the MMU locates the already-existing virtual-to-physical address mapping in the TLB. However, if for some reason, the virtual-to-physical address mapping does not exist in the TLB, the MMU initiates a page fault and the process described in Steps 704-710 are performed.

In Step 808, the MMU reads the data at the physical addresses specified by the TLB. In one or more embodiments of the invention, the MMU transmits that data to one or more processors (and the cache therein) for temporary storage while being read by the application.

In Step 810, one or more processors receives the data from memory, via the MMU. In one or more embodiments of the invention, a processor stores that data in the cache local to the processor for more rapid reading and manipulation. Further, once in cache, the processor may provide the data to the application, as initially requested.

Figure 8B:
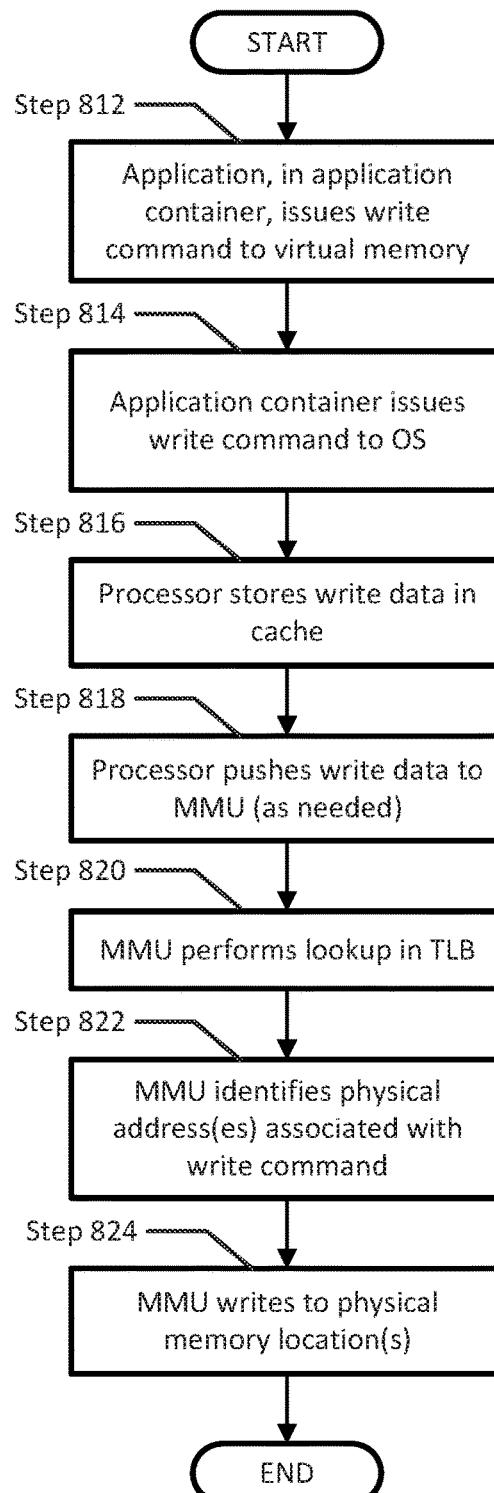
FIG. 8B shows a flowchart of a method of directly writing data in accordance with one or more embodiments of the invention.

FIG. 8B shows a flowchart of a method for directly writing to a region of memory, in accordance with one or more embodiments of the invention. All or a portion of the method shown in FIG. 8B may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 812, an application issues a write request to store new data in the virtual address space of that application (or overwrite/modify existing data in the virtual address space). In one or more embodiments of the invention, the write request specifies the virtual address space segment (e.g., virtual address) of the virtual address space and the data to be written to the associated virtual address space segment. Further, in one embodiment of the invention, the application is aware that a memory mapping exists for the utilized virtual address space segments.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 814, the application container, to which the application belongs, forwards the write request to the OS. In one or more embodiments of the invention, although the application issued the write request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 816, the processor writes the requested data to the cache. In one or more embodiments of the invention, the processors receives the write request issued by the application and processes that new data (or changes to existing data) in the local cache of the processor. That is, even though the application specified a virtual address which is mapped to a physical address of memory, the processor may first internally stores and processes the changes requested by the application. In one embodiment of the invention, when data is located in cache, instead of its intended location in memory and/or persistent storage, that data may be considered "uncommitted" or "dirty". Further, in one embodiment of the invention, the application is unaware of whether the data sent in the write request is stored in cache or in the intended physical location of memory (associated with the virtual address).

In Step 818, the processor initiates of copy of the new data (of the write request) to memory via the MMU. In one or more embodiments of the invention, the cache is a limited resource (e.g., little total space) and may therefore reach a maximum capacity more quickly than other devices of the hardware layer. In the event the cache is determined to be too full, the processor begins copying certain data from the internal cache to the location originally specified by the request. The determination of which data in the cache to copy to memory may be based on one or more characteristics including, but not limited to, which data is least recently used, which data is least frequently used, and/or any other characteristic for determining which data may be least useful to maintain in cache. In one or more embodiments of the invention, the processor issues a write request to the MMU that includes the modified data and the virtual address specified by the application.

Further, in one embodiment of the invention, the application is unaware of when the processor copies data from cache to memory resulting from a determination that the cache is too full. And, therefore, the application is unaware of whether the data sent in the write request is stored in cache or in the intended physical location of memory (associated with the virtual address).

In Step 820, the MMU of the hardware layer performs a lookup in the TLB to identify a physical address associated with the specified virtual address of the write request. In one or more embodiments of the invention, as described above in Step 604, when a request to access or modify memory is sent to the MMU, using a virtual address, the MMU may perform a lookup in the TLB to find a physical address associated with the provided virtual address (e.g., a virtual-to-physical address mapping).

In Step 822, the MMU identifies the physical address(es) associated with the virtual address of the write request. Specifically, in one embodiment of the invention, where the application had already established a direct mapping (e.g., the process of FIGS. 7A and 7B), the MMU locates the already-existing virtual-to-physical address mapping in the TLB. However, if for some reason, the virtual-to-physical address mapping does not exist in the TLB, the MMU initiates a page fault and the process described in Steps 704-710 are performed.

In Step 824, the MMU copies the data of the write request to the physical addresses specified in the TLB. In one or more embodiments of the invention, after the MMU finishes copying the data to memory, the MMU informs the processor of a successful write. Further, in one embodiment of the invention, the processor may consequently inform the OS that the data was successfully copied to memory, and the OS may inform the application that the data was successfully written to memory.

Figure 9A:
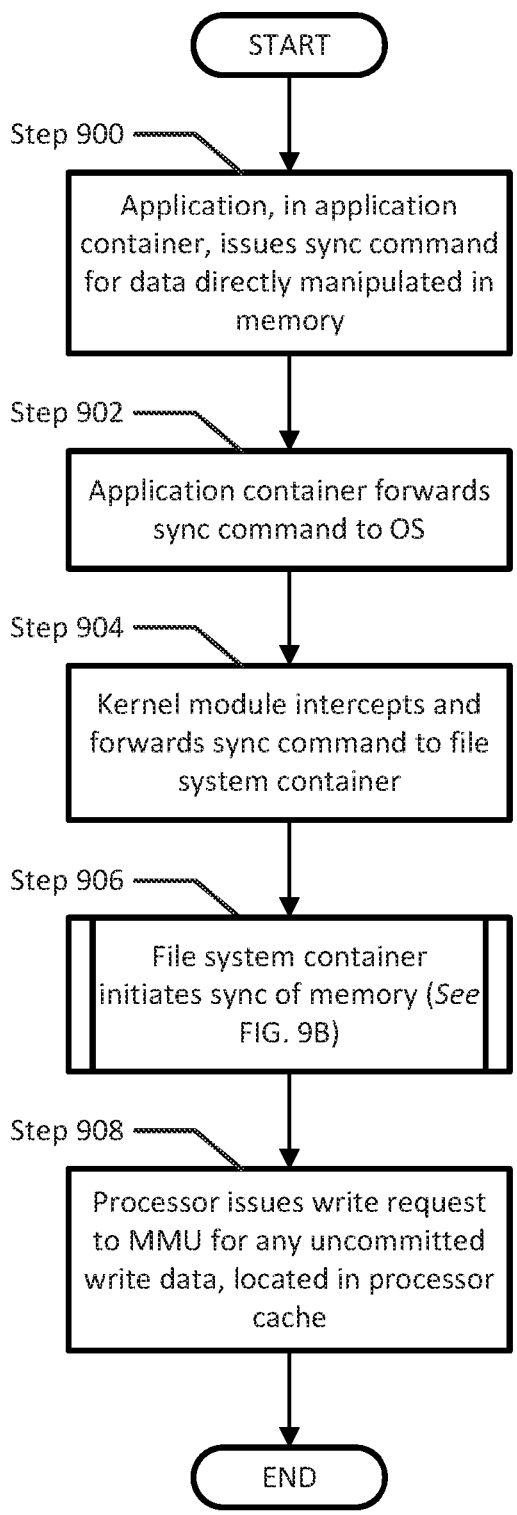
FIG. 9A shows a flowchart of a method of committing data in accordance with one or more embodiments of the invention.

FIG. 9A shows a flowchart of a method for syncing data changes of a memory mapped region, in accordance with one or more embodiments of the invention. All or a portion of the method shown in FIG. 9A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 900, an application issues a sync command for data that has been directly manipulated in memory. In one or more embodiments of the invention, the application is unaware as to whether the data sent in previous write requests has been persisted (e.g., copied) to the physical address(es) of memory associated with the virtual address(es) of the write requests (e.g., whether that data is uncommitted). Accordingly, to force the potentially uncommitted data to be committed (i.e., copied to memory, e.g., PMem), the application may issue a sync command to instruct the processor to force any uncommitted data, located in cache, to memory.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 902, the application container, to which the application belongs, forwards the write request to the OS. In one or more embodiments of the invention, the application container forwards the command, unaltered to the OS of the node. Alternatively, in one embodiment of the invention, the application container may modify the command prior to forwarding, for example, by translating the virtual address specified by the application to another virtual address (in the event of a known conflict) and/or otherwise modify the command to conform with the operations of the node.

In Step 904, the kernel module of the OS intercepts and forwards the sync command to the file system container of the node. In one or more embodiments of the invention, in contrast to Steps 606 and 706, the kernel module intercepts the sync command from the application before being passed to the hardware layer of the node. Specifically, in one embodiment of the invention, the kernel module is configured to identify sync commands and redirect those commands to a new destination (i.e., the file system container).

In Step 906, the file system container, having received and processed the sync command forwarded by the kernel module, re-initiates the sync process by forwarding one or more sync commands back to the OS. More details of the process of Step 906 are discussed in relation to FIG. 9B below.

In Step 908, the processor receives the sync command and initiates the copying of the relevant uncommitted data to memory. In one or more embodiments of the invention, the processor identifies the data associated with the sync command and initiates the copying of the identified data, to memory. As described in Steps 820, 822, and 824 above, the MMU receives the write request, perform a lookup in the TLB, identify the associated physical address(es) in memory for the write request, copy the uncommitted data to the associated physical address(es), then inform the processor of the successful writing of the data. In turn, in one embodiment of the invention, the processor then informs the OS of the successful writing of the data indicated by the sync command to memory; and the OS informs the application that the data was successfully written to memory.

Figure 9B:
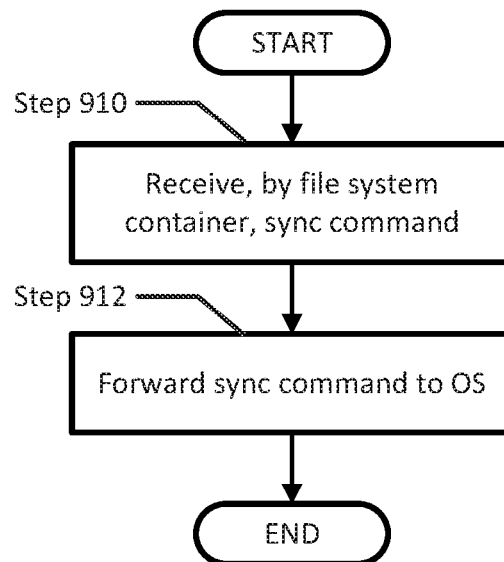
FIG. 9B shows a flowchart of a method of servicing a sync command in accordance with one or more embodiments of the invention.

FIG. 9B shows a flowchart of a method for servicing a sync command, in accordance with one or more embodiments of the invention. All or a portion of the method shown in FIG. 9B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 910, the file system container receives a sync command for data that was being directly manipulated by the application. In one or more embodiments of the invention, the space manager may modify the sync command consistent with the physical addresses identified in one or more memory pool(s). Further, the sync command may be modified such that the kernel module will not, again, intercept the sync command when traversing the OS. In one embodiment of the invention, if one or more memory pool segments associated with the sync command are associated with two or more memory segments, the space manager may generate additional sync commands to duplicate the changes in data to those additional memory segments.

In Step 912, the file system container forwards the sync command(s) to the OS in order to commit the data, located in cache, to memory. In one or more embodiments of the invention, the sync command may be the same sync command as originally received by the file system container, or alternatively be modified consistent with the one or more determinations of Step 910.

Figure 10:
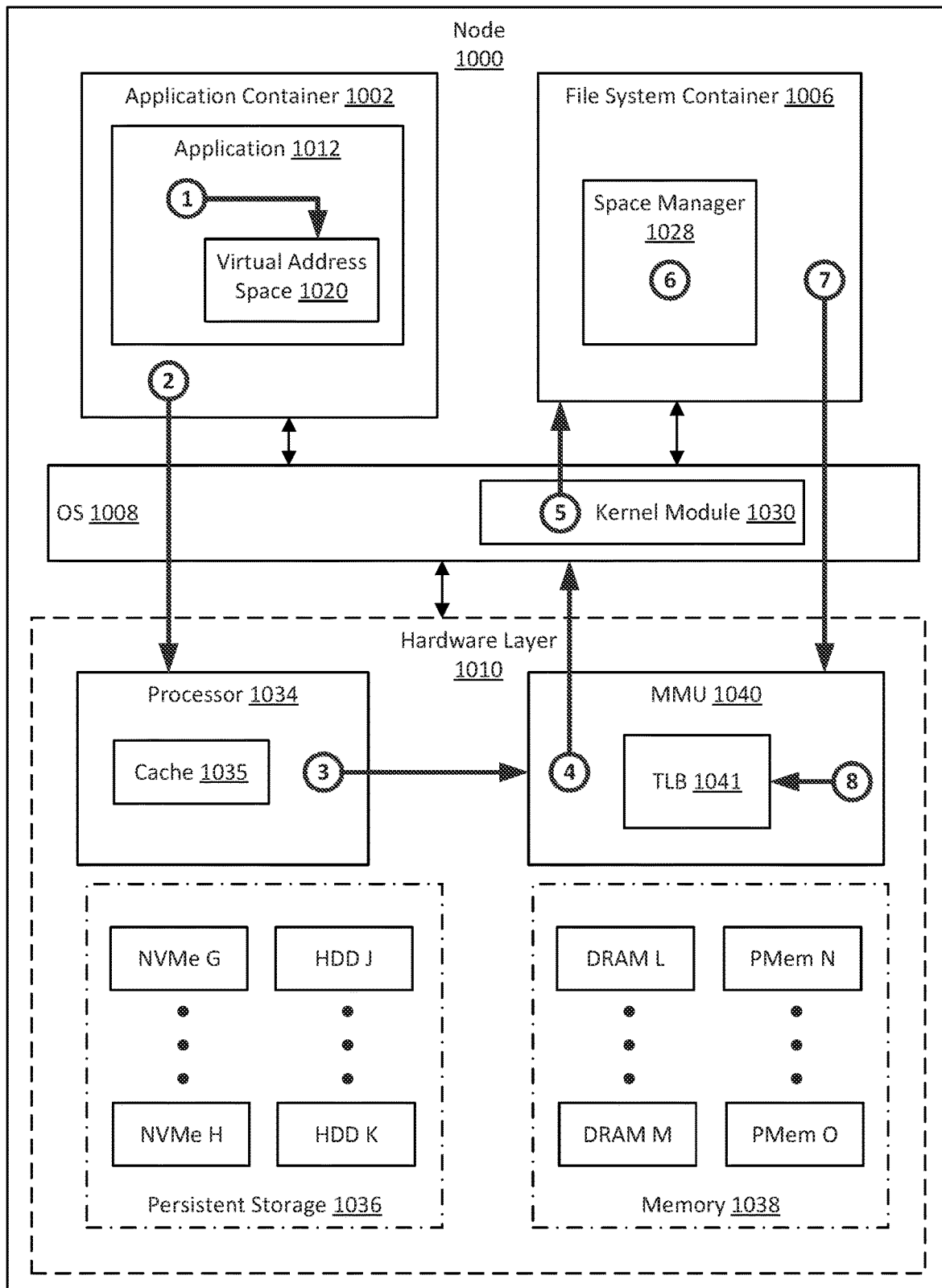
FIG. 10 shows an example in accordance with one or more embodiments of the invention.

FIG. 10 shows an example in accordance with one or more embodiments of the invention. The following use case is for explanatory purposes only and not intended to limit the scope to this embodiment.

In FIG. 10, consider a scenario in which, at (1), application (1012) issues a mapping request for data in virtual address space (1020) to establish direct access to memory (1038). The mapping request specifies a virtual address of the virtual address space (1020) and specific data using a file identifier and a file offset.

At (2), application container (1002) forwards the mapping request to the OS (1008). Here, the application container (1002) forwards the request, unaltered to the OS (1008) of the node (1000). Further, the OS (1008) passes the mapping request to hardware layer (1010) of the node (1000) without any additional processing.

At (3), the processor (1034) receives the mapping request in the hardware layer (1010) and forwards the request to the MMU (1040). At (4), the MMU (1040) performs a lookup in TLB (1041) to locate a physical address associated with the virtual address of the mapping request. However, the TLB (1041) does not contain a virtual-to-physical address mapping for the specified virtual address. Accordingly, the MMU (1040) issues a page fault to the OS (1008) that includes the mapping request.

At (5), the kernel module (1030) detects a page fault in the OS (1008) and interrupts normal handling of the page fault by the OS (1008). Specifically, the kernel module (1030) intercepts the page fault and forwards the mapping request (of the page fault) to the file system container (1006).

At (6), the space manager (1028) of the file system container (1006) receives the mapping request and locates the file in the sparse virtual space by analyzing the file identifier to identify a logical volume and a logical volume offset, within that logical volume, associated with file identifier. Once the logical volume offset is known, the sparse virtual space segments associated with that file are similarly identified. Further, using the specified file offset, the space manager (1028) identifies and locates the sparse virtual space segment specific to the data specified in the received mapping request.

Further, at (6), the space manager (1028) identifies that the sparse virtual space segment is associated with memory pool segment, which in turn, is directly associated with a memory segment (and corresponding physical address). The space manager (1028) then generates and initiates the transmission of a virtual-to-physical address mapping that specifies the virtual address of the mapping request and the physical address identified from the memory pool segment.

At (7), the file system container (1006) forwards the virtual-to-physical address mapping to the MMU (1040). In one or more embodiments of the invention, the file system container (1006) transmits the virtual-to-physical address mapping to hardware layer (1010) via the OS (1008).

At (8), the MMU (1040) writes a new entry to the TLB (1041) corresponding to the virtual-to-physical address mapping received from the file system container (1006). After the MMU (1040) writes the entry into the TLB (1041), the MMU (1040) additionally informs the OS (1008) that the memory mapping was successful. In turn the OS (1008) informs the application container (1002) and the application (1012) that the memory mapping request was successfully serviced and direct access has been established.

Figure 11:
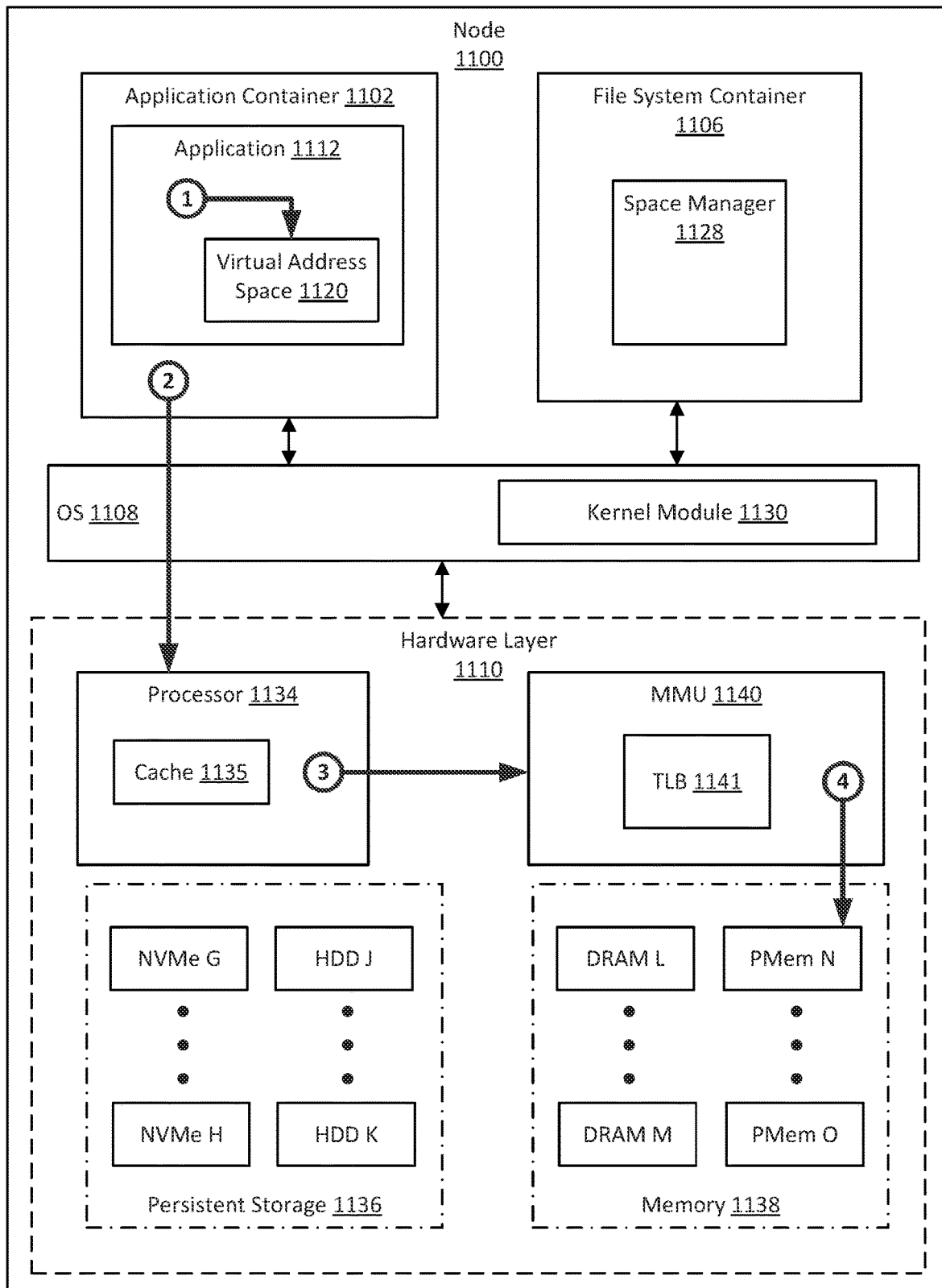
FIG. 11 shows an example in accordance with one or more embodiments of the invention.

FIG. 11 shows an example in accordance with one or more embodiments of the invention. The following use case is for explanatory purposes only and not intended to limit the scope to this embodiment.

In FIG. 11, consider a scenario in which, at (1), application (1112) issues a write request to overwrite existing data in virtual address space (1120) for which direct access to memory (1138) has already been established. The write request specifies a virtual address and the changes to the data.

At (2), application container (1102) forwards the write request to the OS (1108). Here, the application container (1002) forwards the request, unaltered to the OS (1108) of the node (1100). Further, the OS (1108) passes the write request to hardware layer (1110) of the node (1100) without any additional processing.

At (3), the processor (1134) receives the write request in the hardware layer (1110), stores the data changes to cache (1135), and forwards the request to the MMU (1140). At (4), the MMU (1140) performs a lookup in TLB (1141) to locate a physical address associated with the virtual address of the mapping request. The TLB (1141) then successfully identifies and returns to the MMU (1140) the physical address associated with the virtual address. The MMU (1140) then copies the data changes from cache (1135) to the physical location in memory (1138) specified by the physical address found in the TLB (1141). Specifically, in this case, the data is written to some portion of PMem N.

Figure 12:
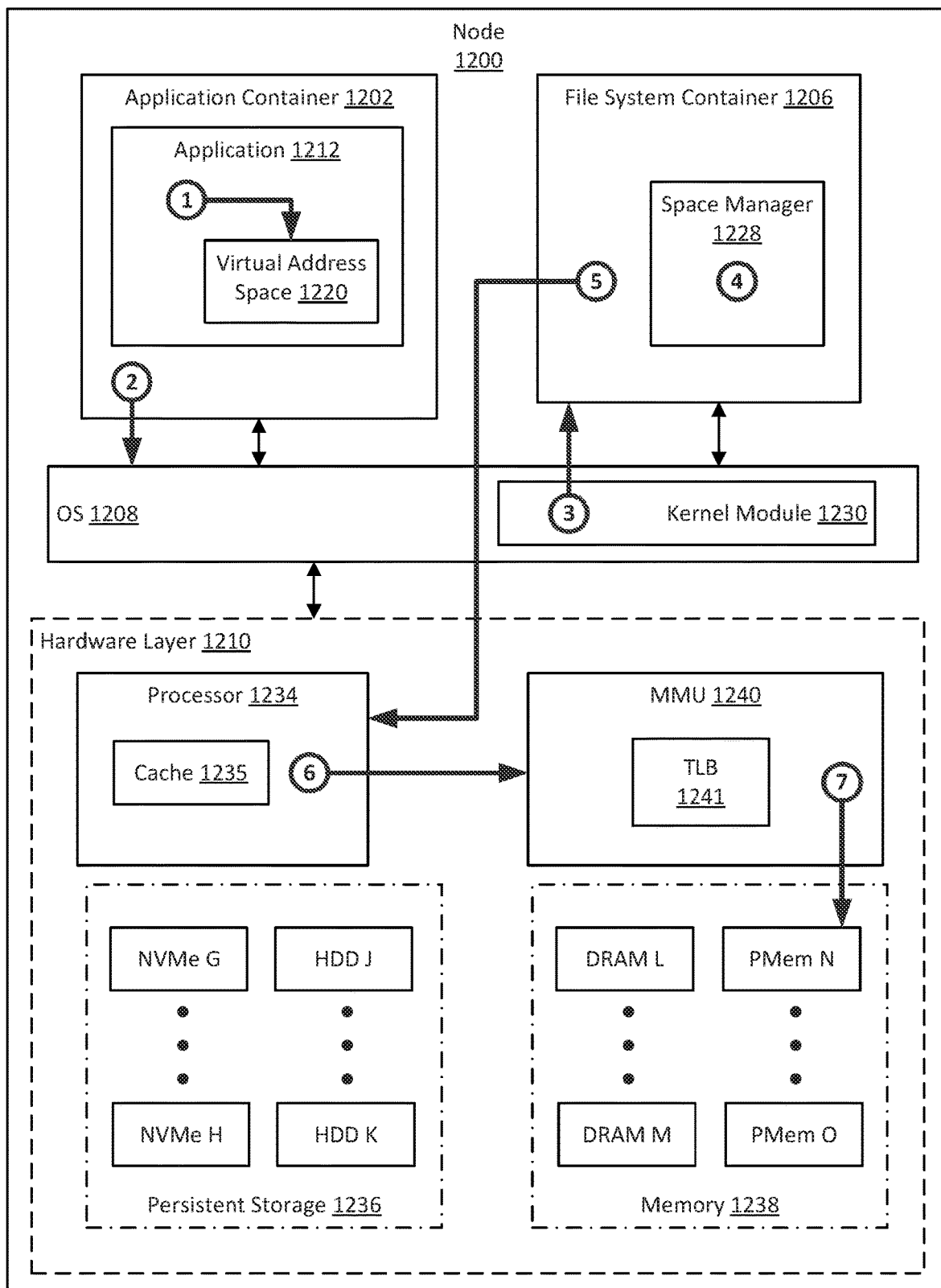
FIG. 12 shows an example in accordance with one or more embodiments of the invention.

FIG. 12 shows an example in accordance with one or more embodiments of the invention. The following use case is for explanatory purposes only and not intended to limit the scope to this embodiment.

In FIG. 12, consider a scenario in which, at (1), application (1212) issues a sync command for data being manipulated in the virtual address space (1220) via direct access to memory (1238). The sync command specifies a virtual address of the virtual address space (1220) and the modified data.

At (2), application container (1002) forwards the sync command to the OS (1208). Here, the application container (1202) forwards the request, unaltered to the OS (1208) of the node (1200). At (3), the kernel module (1230) detects the sync command in the OS (1208) and interrupts normal handling of the sync command by the OS (1208). Specifically, the kernel module (1230) intercepts the sync command and forwards the sync command to the file system container (1206).

At (4), the space manager (1228) of the file system container (1206) receives the sync command and identifies each memory segment affected by the sync command. Then, after identifying that PMem N is only affected memory (1238) device, space manager (1228) analyzes the sync command to ensure that the sync command properly specifies copying data to correct physical locations. The space manager (1228) then regenerates the sync command consistent with the physical locations identified in the memory pool.

At (5), the file system container (1206) forwards the sync command to the processor (1234) through OS (1208). At (6), processor (1234) receives the sync command and identifies all relevant uncommitted data associated with the sync command, in cache (1235), to be copied to memory (1238). Processor (1234) then initiates copying the identified uncommitted data to memory by sending a write request to the MMU (1240) to copy the data to memory (1238).

At (7), the MMU (1240) performs a lookup in TLB (1241) to locate a physical address associated with the virtual address of the write request from the processor (1234). The TLB (1241) then successfully identifies and returns, to the MMU (1240), the physical address associated with the virtual address. The MMU (1240) then copies the data from cache (1235) to the physical location in memory (1238) specified by the physical address found in the TLB (1241). Specifically, in this case, the data is written to some portion of PMem N.

Figure 13:
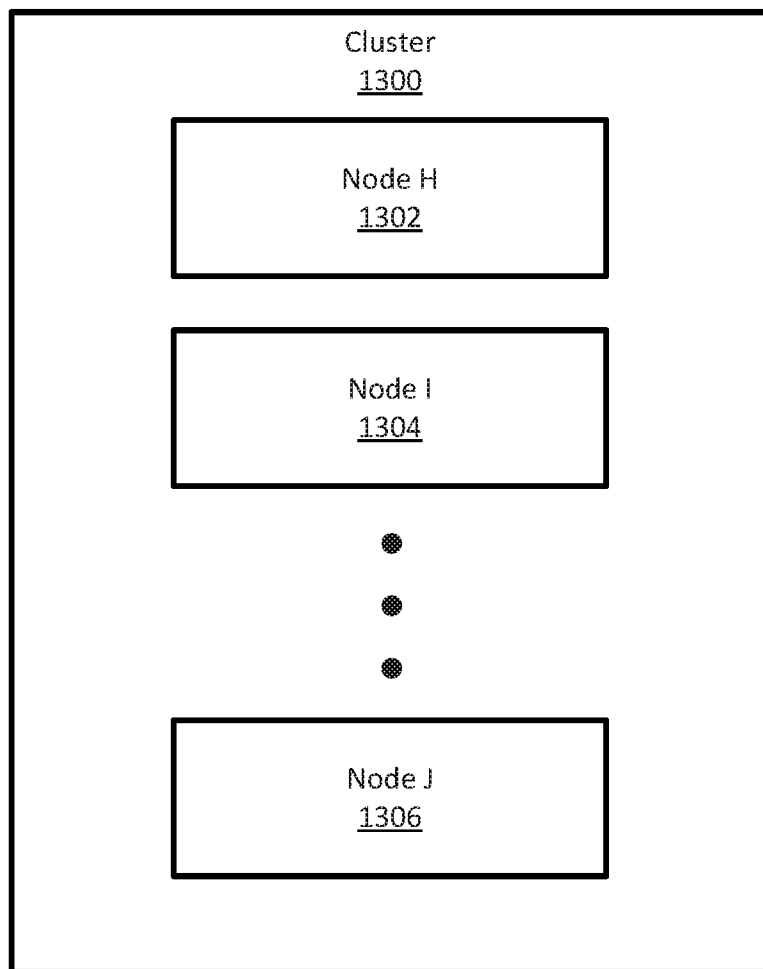
FIG. 13 shows a diagram of a cluster in accordance with one or more embodiments of the invention.

FIG. 13 shows a diagram of a cluster (1300) in accordance with one or more embodiments of the invention. In one embodiment of the invention, cluster (1300) includes one or more node(s) (e.g., node H (1302), node I (1304), node J (1306)). The node(s) (1302, 1304, 1306) shown in FIG. 13 have all of the same properties and functionalities as discussed in the description of FIG. 2.

In one or more embodiments of the invention, a cluster (e.g., cluster (1300)) is a collection of two or more operatively connected node(s) (1302, 1304, 1306). Node(s) (1302, 1304, 1306) of cluster (1300) may be operatively connected via the same LAN, operatively connected via a WAN, or grouped within several LANs, each of which is operatively connected via a WAN. One of ordinary skill in the art, having the benefit of this detailed description, will appreciate that the node(s) (1302, 1304, 1306) may be operatively connected via one or more forms of communication.

In one or more embodiments of the invention, node(s) (1302, 1304, 1306) may be grouped within a cluster (e.g., cluster (1300)) based on one or more characteristics of the node(s) (1302, 1304, 1306). For example, nodes (1302, 1304, 1306) may be within cluster (1300) due to their operations being mutually dependent upon access to the other nodes (1302, 1304, 1306) of the cluster (1300). Alternatively, as an example, node(s) (1302, 1304, 1306) may be within cluster (1300) due to their common ownership and desire for nodes (1302, 1304, 1306) to be operatively connected.

In one or more embodiments of the invention, nodes (1302, 1304, 1306) may be operatively connected via the communication interface(s) located within each node. Nodes (1302, 1304, 1306) may utilize one or more protocols to enable the communication of one or more components within each node. For example, each node (1302, 1304, 1306) of cluster (1300) may be operatively connected, via Ethernet, using a TCP/IP protocol to form a "network fabric" and enable the communication of data between nodes. In one or more embodiments of the invention, each node within a cluster may be given a unique identifier (e.g., an IP address) to be used when utilizing one or more protocols.

Further, in one or more embodiments of the invention, the implementation of certain protocols (e.g., TCP/IP) may enable specific protocol variants that allow for the direct access to memory of other, operatively connected, nodes (i.e., RDMA) and thus form a "memory fabric". Additionally, in one or more embodiments of the invention, nodes (1302, 1304, 1306) may be alternatively, or additionally, operatively connected via, for example, fiber optic connections to form a "fiber optic fabric" to enable the communication of data between nodes (1302, 1304, 1306). One of ordinary skill in the art, having the benefit of this detailed description, will appreciate that the node(s) (1302, 1304, 1306) of cluster (1300) may be connected via one or more physical network interfaces, using one or more protocols, to enable the communication of data from one or more components of the hardware layer of any node (1302, 1304, 1306) within the cluster (1300).

Further, in one embodiment of the invention, when using certain a protocol or variant thereof, streamlined access to certain components of other nodes (1302, 1304, 1306) becomes possible. For example, when utilizing RDMA to access the data on another node (1302, 1304, 1306), it may not be necessary to interact with the software of that other node (1302, 1304, 1306). Rather, when using RDMA, it may be possible for one node (1302, 1304, 1306) to interact only with the hardware elements of the other node (1302, 1304, 1306) to retrieve and/or transmit data, thereby avoiding any higher-level processing by the software executing on that other node (1302, 1304, 1306).

Alternatively, in one or more embodiments of the invention, nodes (1302, 1304, 1306) of cluster (1300) interact with, initiate, alter, and/or control the software (containers, applications, OS) executing on other nodes. Thus, in one or more embodiments of the invention, the communication between nodes (1302, 1304, 1306) of cluster (1300) is not limited to the sharing of stored data in the hardware layer of each node (1302, 1304, 1306). Rather, nodes (1302, 1304, 1306) may communicate instructions related to the execution of software including, for example, requesting the space manager of another node (1302, 1304, 1306) provide information or initiate a process on that other node (1302, 1304, 1306). Accordingly, in one embodiment of the invention, a node (1302, 1304, 1306) may outsource the processing of one or more software tasks to another node (1302, 1304, 1306).

In one or more embodiments of the invention, a node (1302, 1304, 1306) may be considered an "independent fault domain". Specifically, as a node (1302, 1304, 1306), in one embodiment of the invention, includes all components necessary to function inside the node (1302, 1304, 1306) itself, the failure of a node (1302, 1304, 1306) may not result in the failure of other nodes (1302, 1304, 1306). Thus, for example, while two or more nodes (1302, 1304, 1306) may communicate to form a cluster (1300), every individual node (1302, 1304, 1306) within that cluster (1300) may continue to operate upon the failure of every other node (1302, 1304, 1306) (although the functioning of one or more node(s) may be altered due to the failure of another node).

While FIG. 13 shows a specific configuration of a cluster, other configurations may be used without departing from the scope of the disclosure. Accordingly, embodiments disclosed herein should not be limited to the configuration of devices and/or components shown in FIG. 13.

Figure 14:
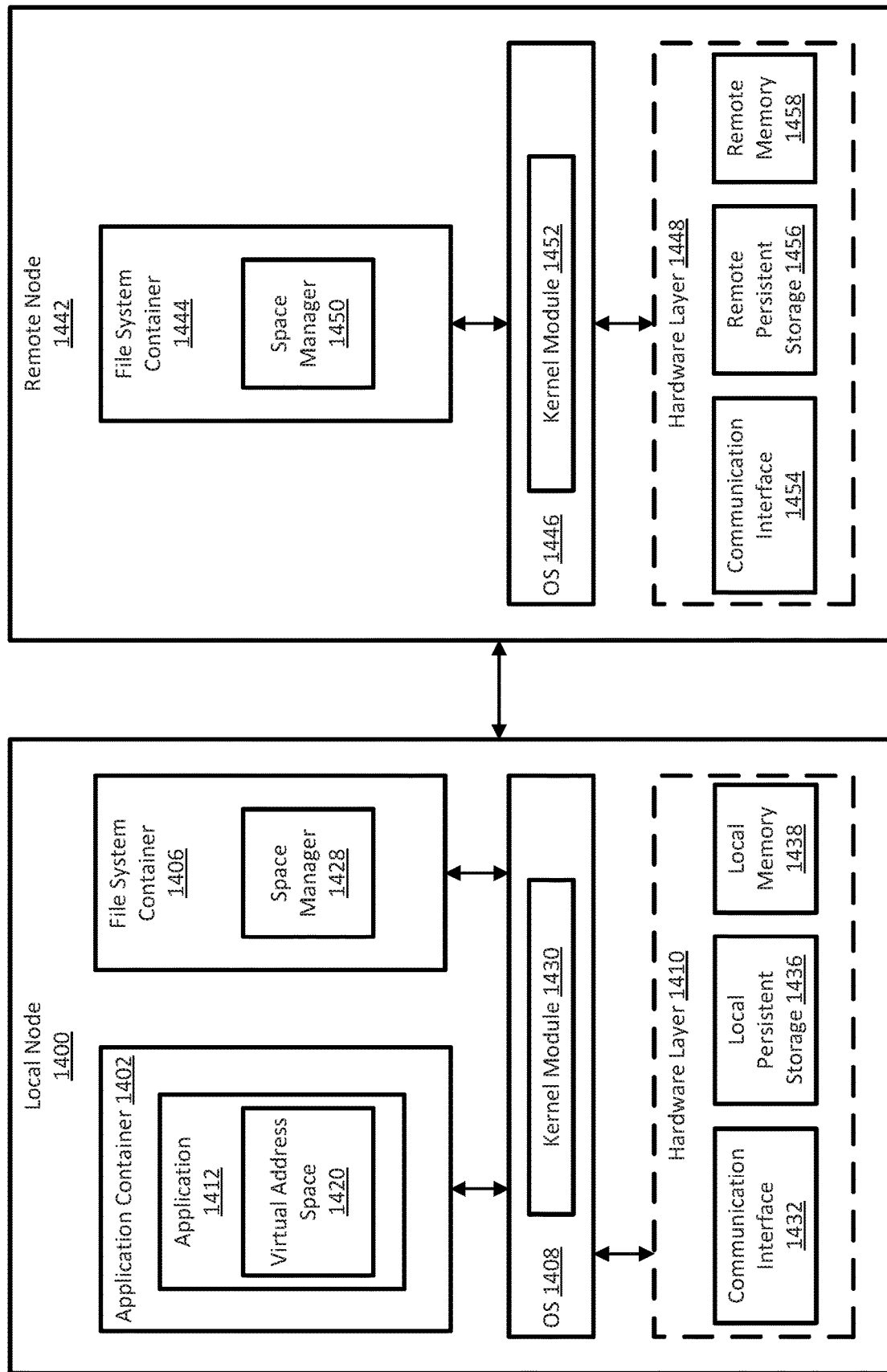
FIG. 14 shows an example of a two-node system in accordance with one or more embodiments of the invention.

FIG. 14 shows an example of one embodiment of a local node (1400) and a remote node (1442). In one embodiment of the invention, local node (1400) includes an application container (1402) with application (1412) and virtual address space (1420), a file system container (1406) with space manager (1428), an OS (1408) with kernel module (1430), and a hardware layer (1410) with communication interface (1432), local persistent storage (1436), and local memory (1438). In one embodiment of the invention, remote node (1442) includes a file system container (1444) with space manager (1450), an OS (1446) with kernel module (1452), and a hardware layer (1448) with communication interface (1454), remote persistent storage (1456), and remote memory (1458). Similarly named parts shown in FIG. 14 have all of the same properties and functionalities as described above in FIG. 2. Accordingly, only additional properties and functionalities are described below.

In one or more embodiments of the invention, local persistent storage (1436) and local memory (1438) may be considered "local" due to their physical location within the local node (1400). Accordingly, in one or more embodiments of the invention, local node (1400) is configured to access local persistent storage (1436) and/or local memory (1438), via the circuitry internal to the hardware layer (1410) of the local node (1400) without using the communication interface (1432). Alternatively, remote persistent storage (1456) and remote memory (1458) may be considered "remote", from the perspective of local node (1400), due to their physical location outside of local node (1400). Thus, in one or more embodiments of the invention, local node (1400) is configured to access remote persistent storage (1456) and remote memory (1458) via the communication interfaces (1432, 1454) of local node (1400) and remote node (1442).

One of ordinary skill in the art, having the benefit of this detailed description, will appreciate that terms "local" and "remote" are relative to the perspective of the node (1400, 1442) performing the described operation. In the example shown in FIG. 14, the adjectives "local" and "remote" are assuming the perspective of the local node (1400). Thus, for example, while labeled "remote memory" (1458), the remote node (1442) is able to access remote memory (1458) as though the remote memory (1458) were "local" (as usage of the communication interface (1454) is not required).

In one or more embodiments of the invention, local node (1400) and remote node (1442) are operatively connected via communication interface (1432) and communication interface (1454). In one embodiment of the invention, the operative connection may be, for example, an Ethernet connection between the local node (1400) and remote node (1442) which allows for the communication of one or more components of the node. Accordingly, the operative connection between local node (1400) and remote node (1442) enables local node (1400) to access remote persistent storage (1456) and remote memory (1458) of remote node (1442). Conversely, the operative connection between remote node (1442) and local node (1400) enables remote node (1442) to access local persistent storage (1436) and local memory (1438) of local node (1400).

While FIG. 14 shows a specific configuration of a cluster, other configurations may be used without departing from the scope of the disclosure. For example, while FIG. 14 shows a remote node without an application or application container, one of ordinary skill in the art, having the benefit of this detailed description, will appreciate that the remote node may include some or all of the components of a node described in FIG. 2. Similarly, although the local node (1400) and the remote node (1442) are shown without processor(s), the local node (1400) and the remote node (1442) may still include all of the components as discussed in the description of FIG. 2. Accordingly, embodiments disclosed herein should not be limited to the configuration of devices and/or components shown in FIG. 14.

Figure 15:
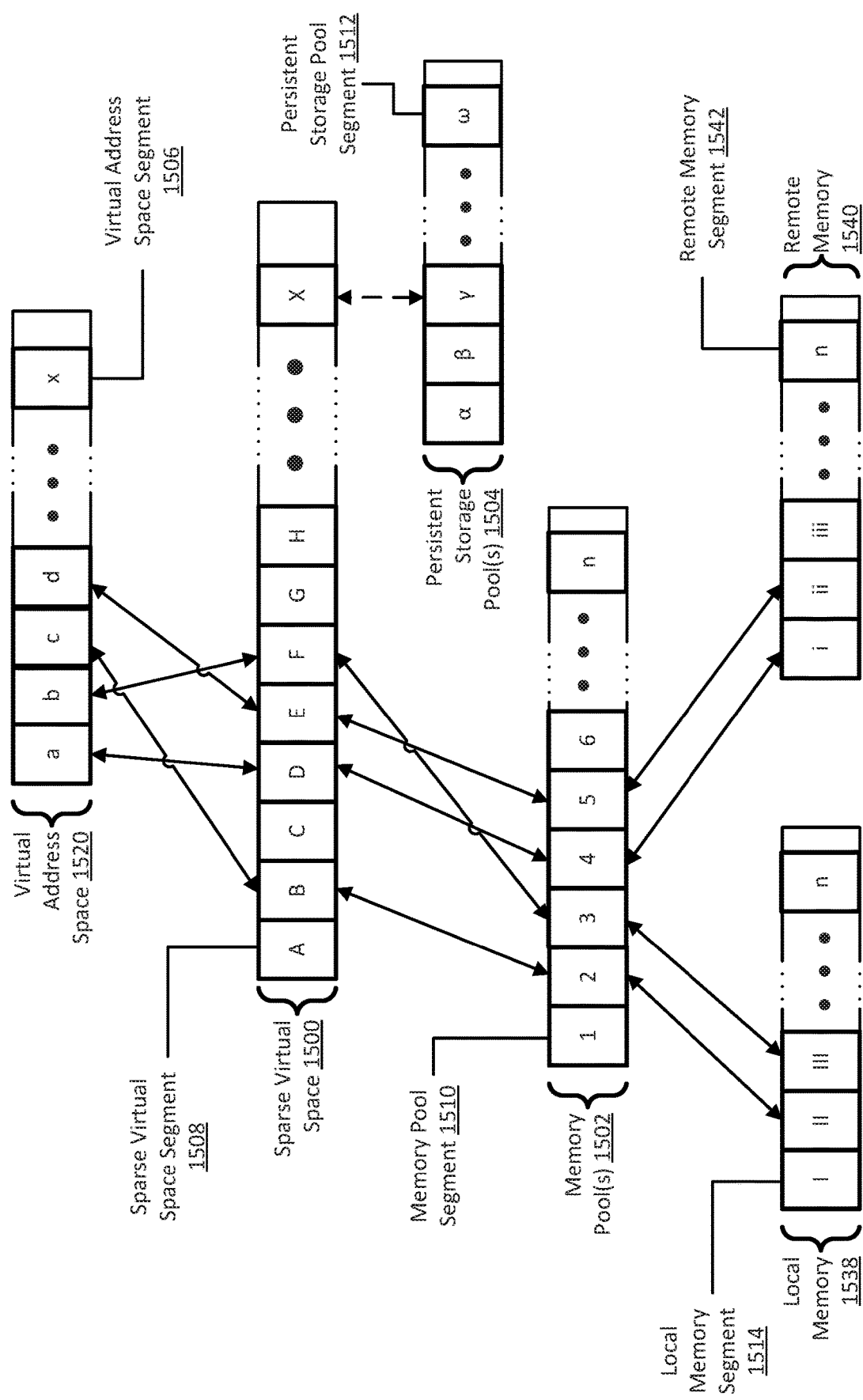
FIG. 15 shows relationships between various virtual and physical elements in the system in accordance with one or more embodiments of the invention.

FIG. 15 shows a diagram of a virtual-to-physical segment hierarchy in accordance with one or more embodiments of the invention. In one embodiment of the invention, the virtual-to-physical segment hierarchy includes a virtual address space (1520), a sparse virtual space (1500), one or more memory pool(s) (1502), one or more persistent storage pool(s) (1504), local memory (1538), and remote memory (1540).

Similarly named parts shown in FIG. 15 have all of the same properties and functionalities as described in FIG. 4. Accordingly, only additional properties and functionalities are described below.

In one or more embodiments of the invention, memory pool(s) (1502) may be associated with both local memory (1538) and remote memory (1540). In one embodiment of the invention, one or more memory pools segment(s) (1510) (of memory pool (1502)) are associated with one or more local memory segment(s) (of local memory (1538)) while other memory pool segments (1510), of the same memory pool (1510), are associated with one or more remote memory segment(s) (1542) (of remote memory (1540)). Accordingly, in one embodiment of the invention, the physical memory devices (e.g., local memory (1538), remote memory (1540), etc.) that are associated with a memory pool (e.g., memory pool (1502)) may be physically located in two or more nodes.

In one or more embodiments of the invention, although the physical memory devices (e.g., local memory (1538), remote memory (1540), etc.), may be located in two or more nodes, the management of the sparse virtual space (1500) and memory pool(s) (1502) remains local to the node (as managed by the space manager). For example, although the memory pool (1502) may be associated with one or more remote memory devices (e.g., remote memory (1540)) located on one or more remote nodes, the management of the memory pool (1502) and its association to the remote memory (e.g., remote memory (1540)) is maintained locally without the need to interface and/or interact with the space manager of the node on which the remote memory is physically located.

Further, as discussed in the description of FIG. 13 and FIG. 14, in one or more embodiments of the invention, the local node may access remote memory (1540) through a communication interface of the hardware layer. Thus, although managed by one or more memory pool(s) (1502), the method for actually obtaining the data from one or more remote memory segment(s) (1542) may necessitate the use of additional hardware and protocols. Thus, even though locally mapped, the memory device (remote memory (1540)) still considered "remote".

Similarly, although not shown in FIG. 15, persistent storage pool(s) (1504) may similarly be associated with one or more local persistent storage devices (not shown) and one or more remote persistent storage devices (not shown). Accordingly, all of the description relating to the memory pool(s) (1502), local memory (1538), and remote memory (1540) above similarly applies with respect to persistent storage pool(s) (1504), local persistent storage (not shown), and remote persistent storage (not shown), respectively.

As discussed in the description of FIG. 4, one of ordinary skill in the art, having the benefit of this detailed description, will appreciate that memory pool(s) (1502) may be organized by any suitable characteristic of the underlying memory (e.g., based on individual size, collective size, type, speed, etc.). Further, in one or more embodiments of the invention, memory pool(s) (1502) and persistent storage pool(s) (1504) may also be categorized, created, and/or otherwise organized based on, at least, the physical location of the underlying device (local memory (1538), remote memory (1540), local persistent storage (not shown), remote persistent storage (not shown)).

For example, there may exist a memory pool (e.g., memory pool (1502)) that is exclusively associated with remote memory devices (e.g., remote memory (1540)), while another memory pool (e.g., memory pool (1502)) may be associated exclusively with local memory devices (e.g., local memory (1538)). Further, the physical location characteristic of the physical device may be just one of two or more characteristic upon which the pool (e.g., memory pool(s) (1502) and persistent storage pool(s) (1504)) may be organized. For example, there may exist a memory pool (e.g., memory pool (1502)) that is associated exclusively with remote DRAM memory devices, or remote DRAM memory devices of a particular remote node. One of ordinary skill in the art, having the benefit of this detailed description, will appreciate that the pools (e.g., memory pool(s) (1502), persistent storage pool(s) (1504), etc.) may be organized by one or more suitable characteristics of the underlying memory (e.g., physical location, individual size, collective size, type, speed, etc.).

While FIG. 15 shows a specific configuration of a virtual-to-physical segment hierarchy, other configurations may be used without departing from the scope of the disclosure. Accordingly, embodiments disclosed herein should not be limited to the configuration of devices and/or components shown in FIG. 15.

Figure 16:
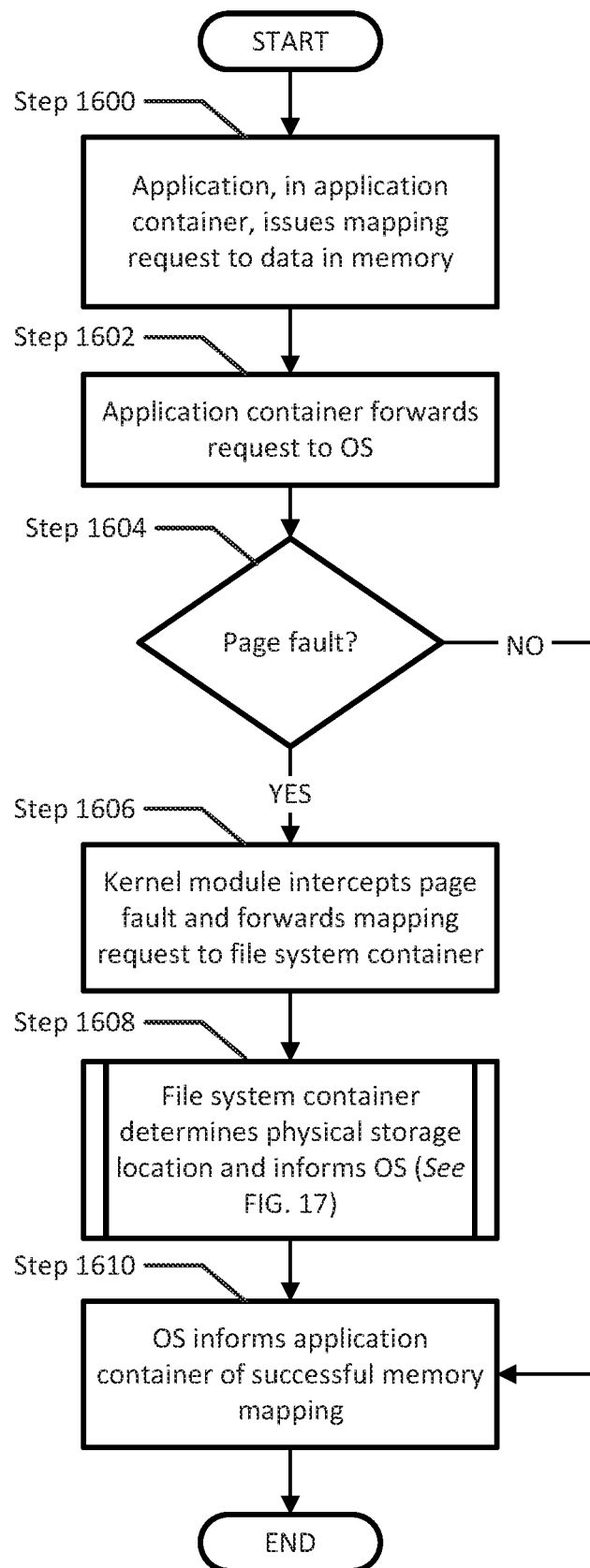
FIG. 16 shows a flowchart of a method of generating and servicing a read request in accordance with one or more embodiments of the invention.

FIG. 16 shows a flowchart of a method for establishing direct access to memory of the hardware layer of the node via a virtual-to-physical address mapping, in accordance with one or more embodiments of the invention. All or a portion of the method shown in FIG. 16 may be performed by one or more components of a node. While the various steps in this flowchart are presented and described sequentially, one of ordinary skill in the relevant art will appreciate that some or all of the steps may be executed in different orders, may be combined or omitted, and some or all steps may be executed in parallel.

In one or more embodiments of the invention, the method of FIG. 16 is substantially similar to the method disclosed in FIG. 7A. Accordingly, in one embodiment of the invention, similarly disclosed steps in FIG. 16 have all of the same properties and purpose as described above in FIG. 7A. Accordingly, only differing and/or additional properties and processes are described below.

After the competition of Step 1606 (similar to Step 706, where the kernel module intercepts and forwards the page fault to the file system container), the process proceeds to Step 1608. Like Step 708 of FIG. 7A, in Step 1608 of FIG. 16, the file system container identifies the physical location of the data and inform the OS of the virtual-to-physical address mapping. However, unlike Step 708 of FIG. 7A, in Step 1608 of FIG. 16, the file system container may determine that the physical location of the requested data is located on a remote node, and may therefore need to request and retrieve a copy of that data (to local memory) prior to informing the OS of the virtual-to-physical address mapping. More details of the process of Step 1608 are discussed in relation to FIG. 17 below.

Figure 17:
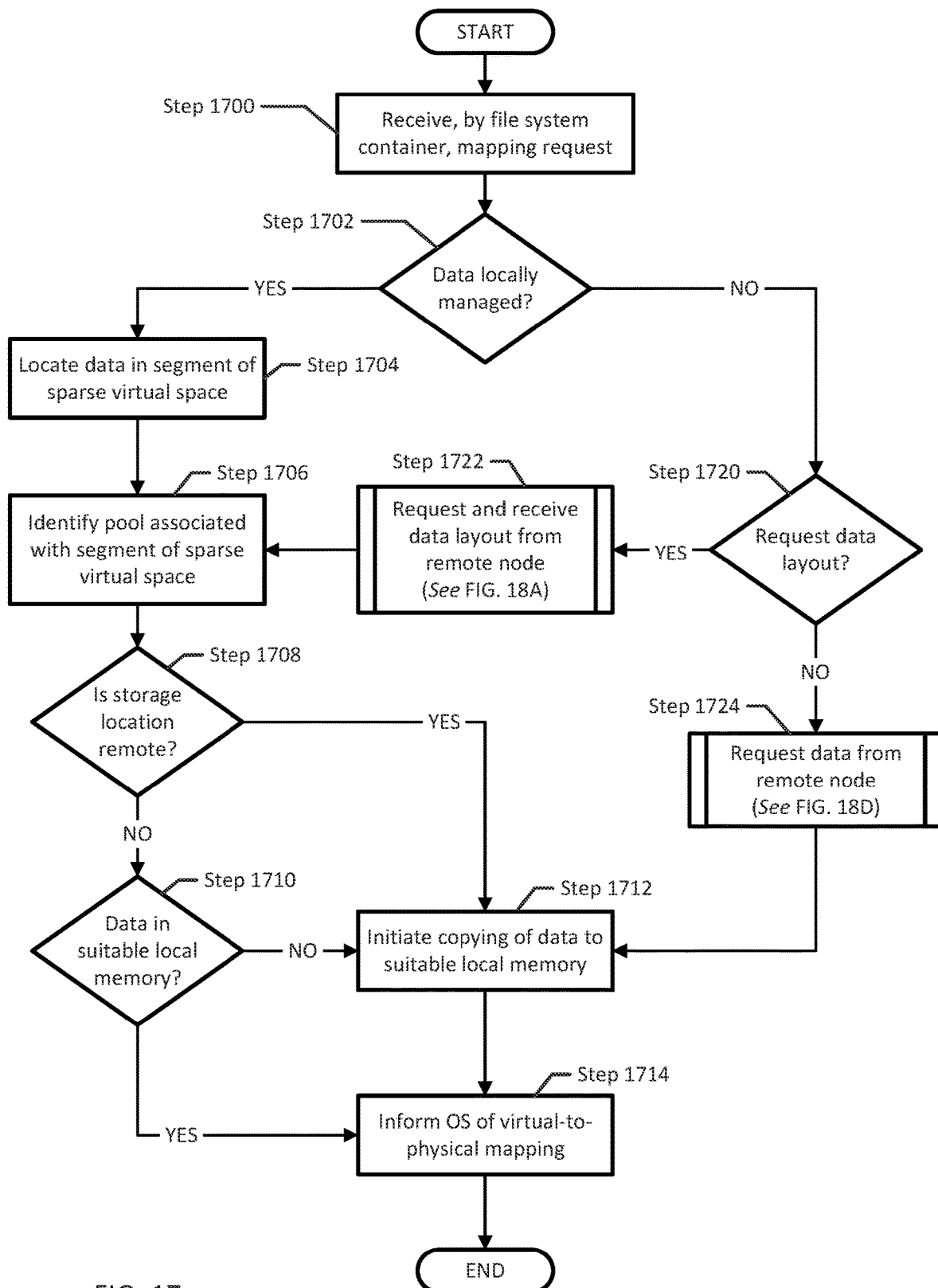
FIG. 17 shows a flowchart of a method of servicing a mapping request in accordance with one or more embodiments of the invention.

FIG. 17 shows a flowchart of a method for identifying a physical location that satisfies the mapping request, in accordance with one or more embodiments of the invention. All or a portion of the method shown in FIG. 17 may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1700, the file system container receives a mapping request or data. As discussed above in Step 706, the file system container may receive a page fault (including the mapping request) or the mapping request, alone, from a kernel module of the node. In one or more embodiments of the invention, the space manager of the file system container processes the mapping request.

In Step 1702, the space manager determines if the data referenced in the mapping request is managed by the space manager (e.g., mapped by the local node). In one or more embodiments of the invention, as discussed in Step 700 above, the mapping request may specify the data using a file identifier and a file offset.

In one or more embodiments of the invention, the space manager uses the file identifier to identify a logical volume associated with that file identifier. Specifically, the space manager may perform a look up the file identifier in a list of logical volumes (e.g., a file system structure) to identify the logical volume to which the specified file belongs. Once the logical volume is known, the space manager then determines whether the logical volume is managed by the local space manager (e.g., associated with the local sparse virtual space).

In one embodiment of the invention, where the logical volume is managed by the space manager (1702-YES), the process proceeds to Step 1704. In one or more embodiments of the invention, the method of Step 1702-YES is substantially similar to the method discussed in description of FIG. 7B. Accordingly, in one embodiment of the invention, similarly disclosed processes of Step 1702-YES have all of the same properties and purpose as described for FIG. 7B.

Alternatively, if the logical volume identified by the space manager is not managed by the file system container of the local node (1702-NO), the space manager needs to perform additional processes before identifying the physical location of the requested data. In one or more embodiments of the invention, the local space manager determines the remote node that manages that logical volume based on the identification of the logical volume to which the file is associated. Accordingly, if the data is not locally managed (1702-NO), the process proceeds to Step 1720.

In Step 1704, the space manager identifies one or more sparse virtual space segments associated with the requested data. In one or more embodiments of the invention, the method of Step 1704 is substantially similar to the method discussed in description of Step 714. Accordingly, in one embodiment of the invention, similarly disclosed processes of Step 1704 have all of the same properties and purpose as described for Step 714. After Step 1704, the process proceeds to Step 1706.

In Step 1706, the space manager identifies the pools mapped to the one or more sparse virtual space segments identified to be associated with the requested data. In one or more embodiments of the invention, the method of Step 1706 is substantially similar to the method discussed in description of Step 716. Accordingly, in one embodiment of the invention, similarly disclosed processes of Step 1706 have all of the same properties and purpose as described for Step 716.

In Step 1708, the space manager determines if the data associated with the identified pool is located on a local device or a remote device. In one or more embodiments of the invention, as discussed in the description of FIG. 15, a locally managed pool (e.g., memory pool or persistent storage pool) may be associated with a remote device (e.g., remote memory or remote persistent storage, respectively). Thus, although locally managed, the local node may need to first retrieve the data from the remote location before servicing the mapping request.

If the data is located on a remote device (1708-YES), the process proceeds to Step 1712. Alternatively, if the data is located on a local device (1708-NO), the process proceeds to Step 1710.

In Step 1710, the space manager determines if the data is located in local device that is suitable for servicing the mapping request. In one or more embodiments of the invention, after the space manager has determined that the data specified in the mapping request is both locally managed (1702-YES) and locally stored (1708-NO), the space manager then needs to determine if the location of the data in the local device is capable of servicing the mapping request (e.g., if it is memory) and further whether that memory is sufficiently suitable.

As discussed in Step 716 above, in one embodiment of the invention, identifying the pool associated with the sparse virtual space segment is sufficient to determine the storage type of the device, as each pool is unique to the two types of storage (persistent storage or memory).

In one or more embodiments of the invention, mapping to a region of memory requires that data to be located on a byte-addressable device (i.e., memory). Accordingly, it is therefore not possible to establish a direct mapping to data physically located in persistent storage (stored in blocks). That is, persistent storage is not configured to support, and is therefore not suitable for, servicing mapping requests. Accordingly, if the specified data of the mapping request is located in persistent storage, the requested data is relocated to a suitable device in order to establish the direct mapping. Thus, in one or more embodiments of the invention, if the data is already located on a device that is suitable for direct memory mapping (i.e., memory), the current location of that data may therefore be considered sufficient to service the request, without first moving the data.

However, in one embodiment of the invention, the space manager may make an additional determination as to the suitability of the memory on which the data is currently located. For example, although it may be possible to service a mapping request using the memory device on which the data is located (as the device is byte-addressable), that particular memory device may not be the most preferable available memory device on which to allow for direct data manipulation. Specifically, in one or more embodiments of the invention, certain memory devices may have characteristics (e.g., lower life expectancy, lower read/write threshold, slower performance, lacking persistence) than other available memory devices and therefore may not be considered 'suitable' for servicing the mapping request. Accordingly, in one embodiment of the invention, if the data is located on a memory device that is not considered suitable, the space manager may initiate copying of that data to a different memory device.

If the requested data is located in persistent storage or non-suitable local memory (1710-NO), the process proceeds to Step 1712. Alternatively, if the requested data is located in suitable memory (1710-YES), the process proceeds to Step 1714.

In Step 1712, the space manager initiates copying of the requested data from its identified location to a location on a suitable local memory device. In one or more embodiments of the invention, the method of Step 1712 is substantially similar to the method discussed in description of Step 720. Accordingly, in one embodiment of the invention, similarly disclosed processes of Step 1712 have all of the same properties and purpose as described for Step 720. Accordingly, only differing and/or additional properties and processes are described below.

In one or more embodiments of the invention, in the instance where the data is located on a remote node, the space manager initiates a copy of the data using one or more communication interface(s) of the node. In one embodiment of the invention, of the invention, the space manager (of the local node) is able to generate a command to copy the data directly from the memory device of the remote node without interacting with the software of the remote node (i.e., via RDMA).

In one or more embodiments of the invention, in the instance where data is located in a non-suitable local memory location, the space manager initiates copying of the data from the non-suitable memory location to a suitable memory location. Specifically, the space manager may analyze one or more memory pools and/or the sparse virtual space to locate regions of suitable physical memory that are available (e.g., includes sufficient free space) to copy to the requested data.

In one or more embodiments of the invention, once the physical location of the requested data and the physical location of available memory are known, the space manager generates a copy command to copy the data from the data's location in persistent storage to the new location in memory.

Accordingly, in one or more embodiments of the invention, once the copy command is generated by the space manager, the file system container forwards that command to the OS to initiate copying of the data from persistent storage to memory.

In Step 1714, the file system container informs the OS of the virtual-to-physical address mapping. In one or more embodiments of the invention, the method of Step 1714 is substantially similar to the method discussed in description of Step 722. Accordingly, in one embodiment of the invention, similarly disclosed processes of Step 1714 have all of the same properties and purpose as described for Step 722.

In Step 1720, the space manager determines if the method for receiving the data should be via requesting the data layout (the memory and/or persistent storage pool associations to underlying physical locations of the data) from the remote node (and initiating the copying of the data locally), or whether the data should be received by requesting the remote node to initiate the copying of the data. In one or more embodiments of the invention, both methods result in the requested data being copied to a local memory device. The determination for choosing which method to request and receive the data may be based on, for example, characteristics of either node (e.g., current operating threshold, capabilities, configuration, etc.).

If the data is to be received via the use of a data layout (1720-YES), the process proceeds to Step 1722. Alternatively, if the data is to be received by requesting the remote node initiate the copying (1720-NO), the process proceeds to Step 1724.

In Step 1722, the local space manager requests and receives the layout of the requested data from the remote space manager. More details of the process of Step 1722 are discussed in relation to FIG. 18A. After Step 1722, the process proceeds to Step 1706.

In Step 1724, the local space manager requests and receives the requested data from the remote node. More details of the process of Step 1724 are discussed in relation to FIG. 18D. After Step 1724, the process proceeds to Step 1712.

Figure 18A:
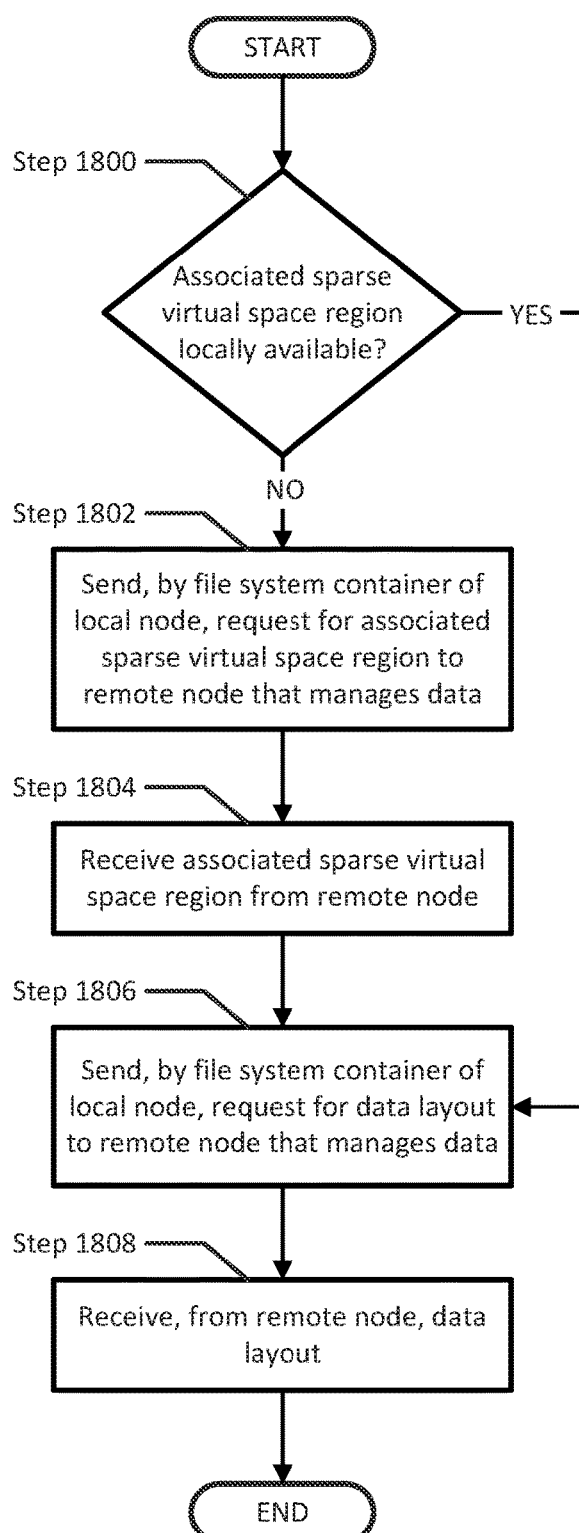
FIG. 18A shows a flowchart of a method of generating a data layout request in accordance with one or more embodiments of the invention.

FIG. 18A shows a flowchart of a method for requesting and receiving a data layout from a remote space manager, in accordance with one or more embodiments of the invention. All or a portion of the method shown in FIG. 18A may be performed by local file system container and/or local space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1800, the space manager determines if the sparse virtual space region (one or more sparse virtual space segments) associated with the requested data is already locally available. In one or more embodiments of the invention, the local node may already have received and stored a copy of the sparse virtual space segments related to the requested data and will therefore not need to request the sparse virtual space region again, but will instead utilize the existing copy of the sparse virtual space region. However, in one embodiment of the invention, if the local space manager is attempting to access the requested data for the first time, a copy of the sparse virtual space segments associated with the requested data will not be present on the local node, and therefore needs to be requested from the remote node that manages the requested data.

If the sparse virtual space region of the requested data is not locally available and needs to be requested (1800-NO), the process proceeds to Step 1802. Alternatively, if the sparse virtual space region of the requested data is already locally available (1800-YES), the process proceeds to Step 1806.

In Step 1802, the file system container, of the local node, sends a request to receive a copy of the sparse virtual space region associated with the requested data. In one or more embodiments of the invention, the local space manager generates the request based on the identification of the node that manages the logical volume to which the requested data is associated. Accordingly, in one embodiment of the invention, the sparse virtual space region request may include the file identifier, the file offset, an identification of the logical volume, and specify, as the recipient, the remote node that manages the logical volume associated with the file (and therefore associated with the requested data) by using, for example, an IP address of that remote node.

In one or more embodiments of the invention, the local file system container sends the sparse virtual space region request to the hardware layer of the local node, where, in turn, one or more components of the local hardware layer send the sparse virtual space region request to the remote node via a communication interface of the local node and a communication interface of the remote node.

In Step 1804, the local node (and the local file system container and local space manager thereof) receives the sparse virtual space region associated with the requested data from the remote node. In one embodiment of the invention, the sparse virtual space region is received via a communication interface of the local node and is processed by the local space manager.

In one or more embodiments of the invention, once the sparse virtual space region is received by the local node, the local space manager is able to identify the memory pool(s) and/or persistent storage pool(s) associated with the requested data. Specifically, the local space manager is able to identify the individual memory pool segments and/or persistent storage pool segments associated with the sparse virtual space segments for the requested data. However, as the local space manager does not have access to a copy of those pools (or segments thereof), the space manager needs to request the associations provided by the pool segments from the remote node (as explained in Step 1806).

In Step 1806, the file system container, of the local node, sends a request to receive a copy of the data layout (the physical location of the requested data) to the remote node. In one or more embodiments of the invention, the space manager generates the data layout request based on the memory and/or persistent storage pool segments associated with the sparse virtual space segments of the requested data.

Accordingly, in one embodiment of the invention, the data layout request may include a reference to the specific memory and/or persistent storage pool segments associated with the requested data, such that remote space manager can quickly identify the physical location associated with those pool segments and send the physical location address(es) back to the local node.

In one or more embodiments of the invention, although the local node maintains a copy of the sparse virtual space region associated with the requested data, the local space manager is unable to identify the physical location of the requested data, as the local file system manager lacks the associations between the sparse virtual space region and the physical location(s) of the requested data (e.g., via the pools associated in between). Accordingly, although the local space manager may be able to identify the specific memory and/or persistent storage pool segments associated with the requested data, the local space manager cannot identify the exact physical addresses at which that data is located, without first receiving a data layout (the memory and/or persistent storage pool associations to the underlying physical locations of the data).

In one or more embodiments of the invention, the local file system container sends the data layout request to the hardware layer of the local node, where, in turn, one or more components of the local hardware layer send the data layout request to the remote node via a communication interface of the local node and a communication interface of the remote node.

In Step 1808, the local node (and the local file system container and local space manager thereof) receives the data layout for the requested data. In one or more embodiments of the invention, the data layout includes the memory and/or persistent storage pool associations to the underlying physical locations of the data. Accordingly, in one or more embodiments of the invention, the local space manager then identifies the exact physical locations of the requested data is (e.g., the memory and/or persistent storage segments and their associated addresses).

Figure 18B:
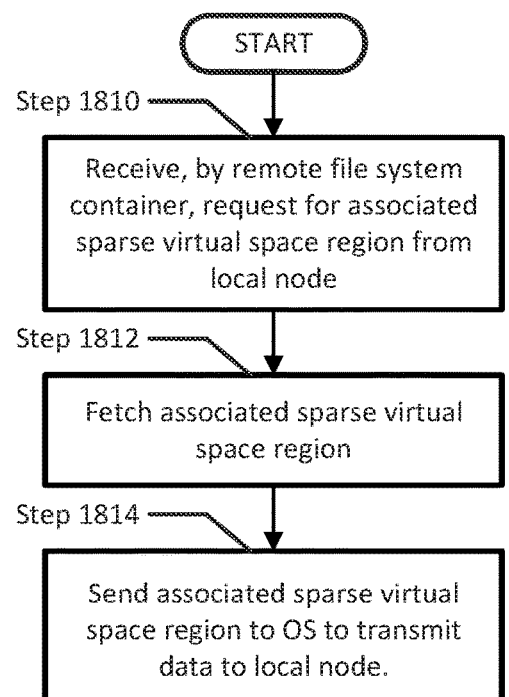
FIG. 18B shows a flowchart of a method of servicing a data structure request in accordance with one or more embodiments of the invention.

FIG. 18B shows a flowchart of a method for servicing a sparse virtual space region request, in accordance with one or more embodiments of the invention. All or a portion of the method shown in FIG. 18B may be performed by remote node and/or remote space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1810, the remote node receives a sparse virtual space region request from the local node (see e.g., FIG. 18A). In one or more embodiments of the invention, the sparse virtual space region request includes the file identifier, the file offset, and an identification of the logical volume associated with the requested data. In one embodiment of the invention, the sparse virtual space region request is received via a communication interface of the remote node that operatively connects the remote node and the local node.

In Step 1812, the space manager of the remote node fetches the sparse virtual space region requested by the local node. In one embodiment of the invention, where the sparse virtual space region request includes the file identifier and file offset specific to the requested data, the remote space manager uses the file identifier to identify a logical volume and a logical volume offset, within that logical volume, associated with file identifier. Once the logical volume offset is known, the sparse virtual space segment(s) associated with that file are similarly identified (e.g., the sparse virtual space region).

Alternatively, in one or more embodiments of the invention, the sparse virtual space region request may specify the logical volume (already identified by the local node), for which the remote node then uses the file identifier to locate the logical volume offset, within that logical volume identified in the request. Similarly, once the logical volume offset is known, the sparse virtual space segment(s) associated with that file are identified (e.g., the sparse virtual space region).

In Step 1814, the remote node sends a copy of the sparse virtual space region associated with the sparse virtual space region request to the local node. In one or more embodiments of the invention, the remote space manager generates a command to copy the identified sparse virtual space region to the local node. The sparse virtual space region is then sent to the local node via a communication interface of the remote node and local node, respectively.

Figure 18C:
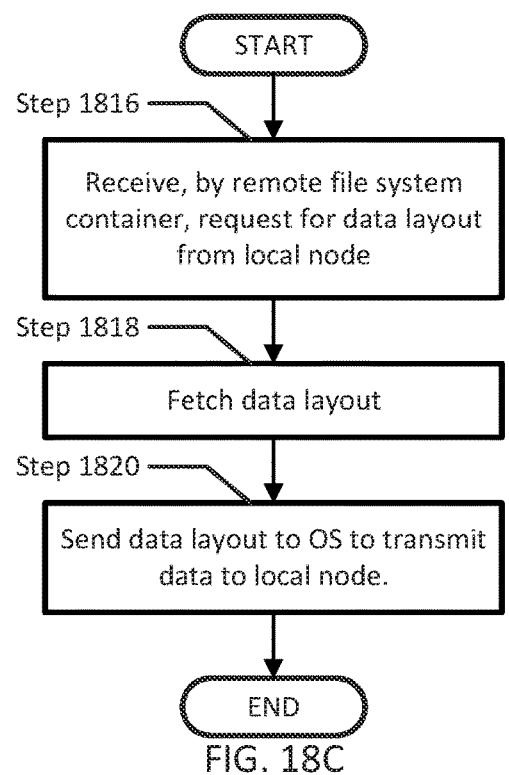
FIG. 18C shows a flowchart of a method of servicing a data layout request in accordance with one or more embodiments of the invention.

FIG. 18C shows a flowchart of a method for servicing a data layout request, in accordance with one or more embodiments of the invention. All or a portion of the method shown in FIG. 18C may be performed by remote node and/or remote space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1816, the remote node receives a data layout request from the local node (see e.g., FIG. 18A). In one or more embodiments of the invention, the data layout request may include a reference to the specific memory and/or persistent storage pool segments associated with the requested data. In one embodiment of the invention, the data layout request is received via a communication interface of the remote node that operatively connects the remote node and the local node.

In Step 1818, the space manager of the remote node fetches the data layout requested by the local node. In one embodiment of the invention, the data layout specifies a reference to the specific memory and/or persistent storage pool segments associated with the requested data.

In one or more embodiments of the invention, as the memory and/or persistent storage pool segments have already been identified (by the local node) in the data layout request, the remote space manager does not have to locate the sparse virtual space segments associated with the requested data. Rather, by using the already-identified memory and/or persistent storage pool segments, the remote space manager may readily identifies the physical locations in the underlying hardware (e.g., the physical address(es) on one or more memory and/or persistent storage devices) associated with each pool segment.

In Step 1820, the remote node sends a copy of the data layout corresponding to the data layout request to the local node. In one or more embodiments of the invention, the remote space manager generates a command to copy the data layout to the local node. In turn, the data layout is then sent to the local node via a communication interface of the remote node and local node, respectively.

Figure 18D:
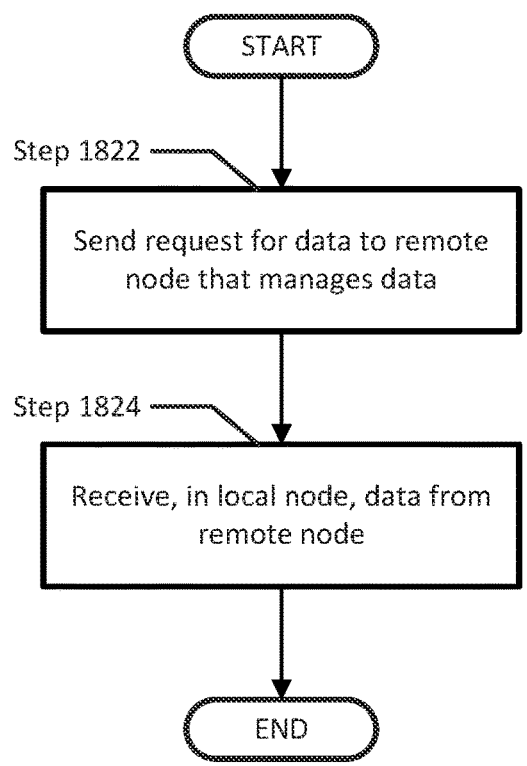
FIG. 18D shows a flowchart of a method of generating a data request in accordance with one or more embodiments of the invention.

FIG. 18D shows a flowchart of a method for requesting and receiving data from a remote node, in accordance with one or more embodiments of the invention. All or a portion of the method shown in FIG. 18D may be performed by local file system container and/or local space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1822, the file system container, of the local node, sends a request to receive a copy of the requested data to the remote node. In one or more embodiments of the invention, the local space manager generates the request based on the identification of the node that manages the logical volume to which the file is associated. Accordingly, in one embodiment of the invention, the copy request may include the file identifier, the file offset, an identification of the logical volume, and specify, as the recipient, the remote node that manages the logical volume associated with the file (and therefore associated with the requested data) by using, for example, an IP address of that remote node.

In one or more embodiments of the invention, the local file system container sends the copy request to the hardware layer of the local node, where, in turn, one or more components of the local hardware layer send the copy request to the remote node via a communication interface of the local node and a communication interface of the remote node, respectively.

In Step 1824, the local node (and the local file system container and local space manager thereof) receives a copy of the requested data (as specified in the original mapping request issued by the application). In one embodiment of the invention, the requested data is received via a communication interface of the local node and is processed by the local space manager.

In one or more embodiments of the invention, once the requested data is received by the local node, the local space is able to identify the physical location of the data within one or more memory device(s) of the local node. Accordingly, as the physical location is known, the local space manager is then able to generate a virtual-to-physical address mapping based on the virtual address specified in the mapping request, and the physical address of the local copy of the requested data.

Figure 18E:
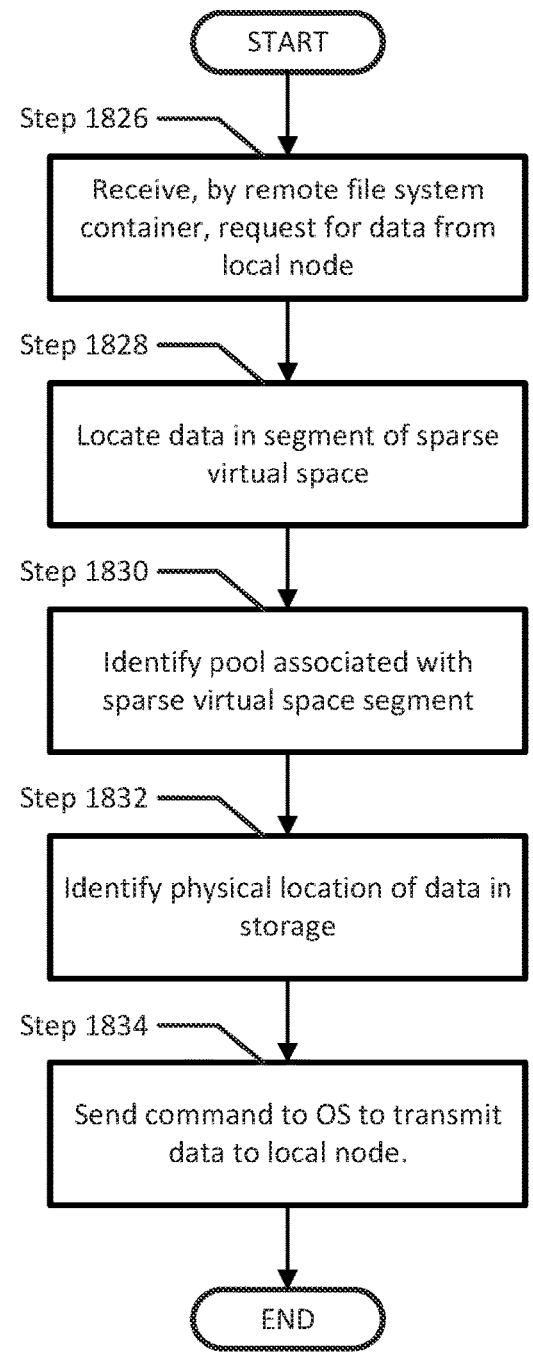
FIG. 18E shows a flowchart of a method of servicing a data request in accordance with one or more embodiments of the invention.

FIG. 18E shows a flowchart of a method for servicing request for data to be transmitted to a local node, from a remote node. All or a portion of the method shown in FIG. 18E may be performed by a remote file system container and/or space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1826, the file system container, of the remote node, receives a request to copy data located in the remote node to a local node (see e.g., FIG. 18D). As discussed above in Step 1822, in one or more embodiments of the invention, the request for data may include the file identifier, the file offset, and an identification of the logical volume associated with the requested data. In one or more embodiments of the invention, the space manager of the remote file system container processes the copy request.

In Step 1828, the space manager (of the remote node) identifies one or more sparse virtual space segments associated with the requested data. In one or more embodiments of the invention, as discussed in Step 700 above, the mapping request may specify the data using a file identifier and a file offset.

In one or more embodiments of the invention, the space manager (of the remote node) uses the file identifier to identify a logical volume and a logical volume offset, within that logical volume, associated with file identifier. Once the logical volume offset is known, the sparse virtual space segment(s) associated with that file are similarly identified. Further, using the specified file offset, one or more sparse virtual space segments are identified (e.g., located) that are specific to the data specified in the mapping request. Accordingly, at this point, the space manager (of the remote node) has located, in the sparse virtual space, the data specified in the mapping request.

In Step 1830, the space manager (of the remote node) identifies the pools mapped to the one or more sparse virtual space segments identified in Step 1828. In one or more embodiments of the invention, the method of Step 1830 is substantially similar to the method disclosed in Step 716. Accordingly, in one embodiment of the invention, similarly disclosed processes of Step 1830 have all of the same properties and purpose as described in Step 716.

In Step 1832, the space manager (of the remote note) identifies the physical location of the data in storage. As discussed in the description of in FIG. 4 and Step 720, each identified persistent storage pool segment is associated with persistent storage segments that identify the physical locations of the requested data. Further, each identified memory pool segment is associated with memory segments that identify the physical locations of the requested data. In one or more embodiments of the invention, the storage device type of the requested data is not relevant as the requested data will need to be copied to local memory of the local node (as the requested data is not located on the local node).

In Step 1834, the space manager (of the remote node) generates a command to copy the data from the identified physical address(es) in the remote node to the local node. In one or more embodiments of the invention, the space manager identifies the local node based on the copy request received in Step 1826.

Figure 19A:
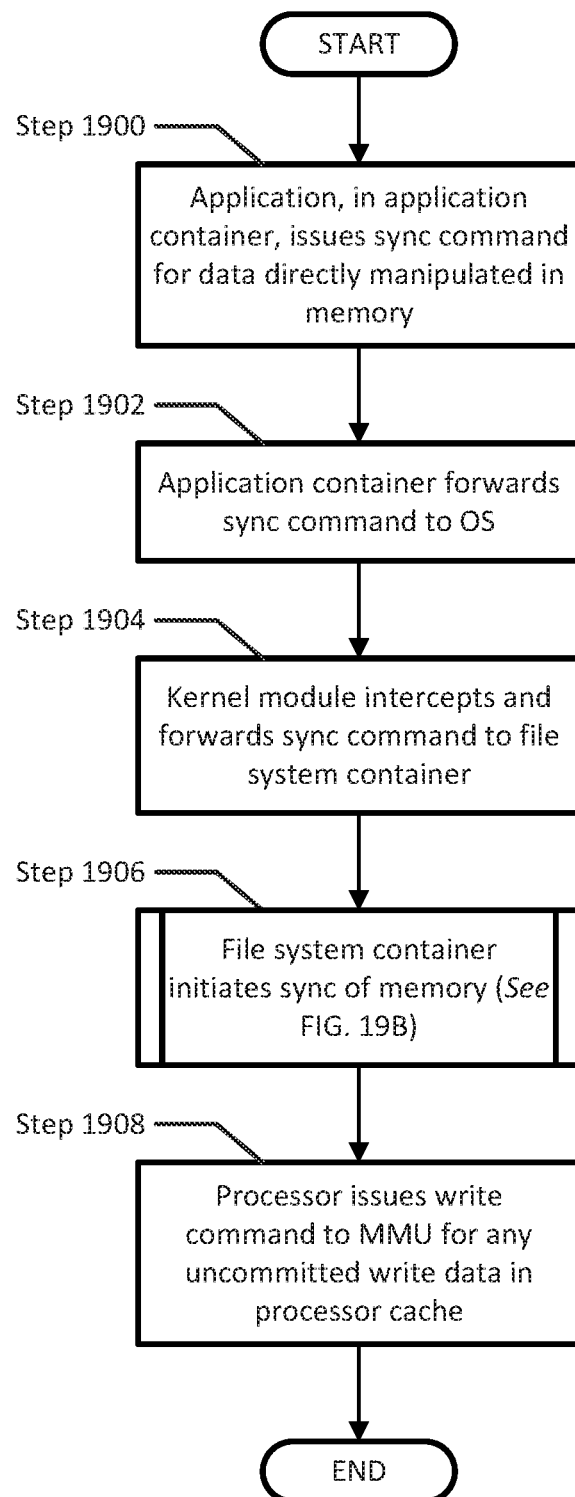
FIG. 19A shows a flowchart of a method of committing data in accordance with one or more embodiments of the invention.

FIG. 19A shows a flowchart of a method for syncing data changes of a memory mapped region where the data was copied from its physical location on a remote node, in accordance with one or more embodiments of the invention. All or a portion of the method shown in FIG. 19A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In one or more embodiments of the invention, the method of FIG. 19A is substantially similar to the method disclosed in FIG. 9A. Accordingly, in one embodiment of the invention, similarly disclosed steps in FIG. 19A have all of the same properties and purpose as described above in FIG. 19A. Accordingly, only differing and/or additional properties and processes are described below.

After the competition of Step 1904 (similar to Step 904, where the kernel module of the OS intercepts and forwards the sync command to the file system container of the node), the process proceeds to Step 1906. Like Step 906 of FIG. 9A, in Step 1906 of FIG. 19A, the file system container, having received and processed the sync command forwarded by the kernel module, re-initiates the sync process by forwarding one or more sync commands back to the OS.

However, unlike Step 906 of FIG. 19A, in Step 1906 of FIG. 19A, the file system container may also generate a command to write data to remote memory, from which the local copy of the modified data originally emanated. More details of the process of Step 1906 are discussed in relation to FIG. 19B below.

Figure 19B:
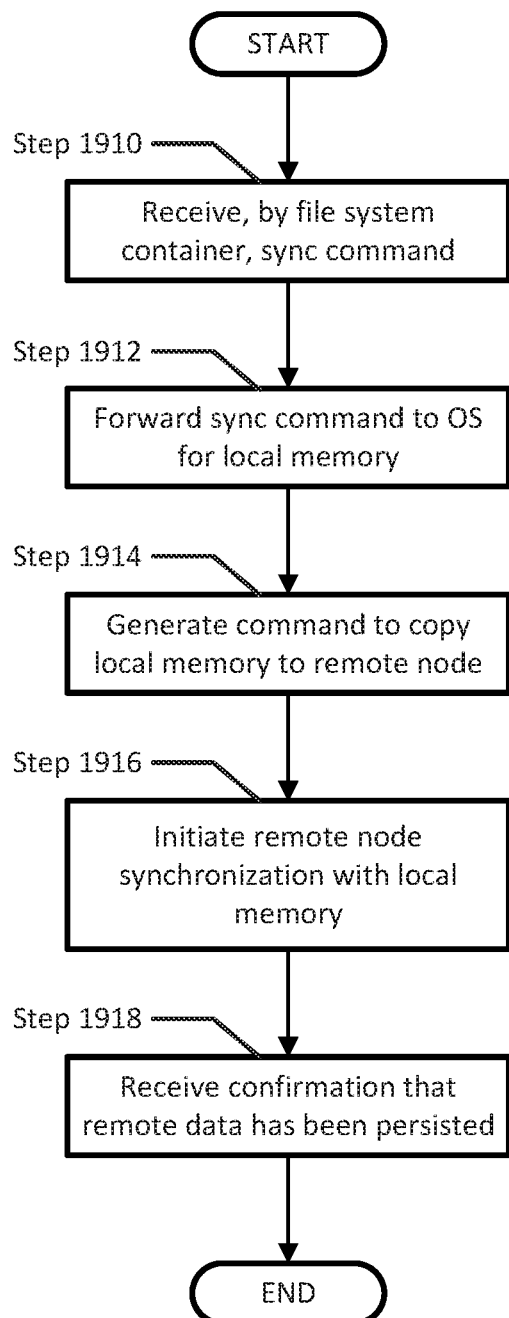
FIG. 19B shows a flowchart of a method of servicing a sync command in accordance with one or more embodiments of the invention.

FIG. 19B shows a flowchart of a method for servicing a sync command, in accordance with one or more embodiments of the invention. All or a portion of the method shown in FIG. 19B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1910, the file system container receives a sync command for data that was being directly manipulated by the application. In one or more embodiments of the invention, the method of Step 1910 is substantially similar to the method discussed in description of Step 910. Accordingly, in one embodiment of the invention, similarly disclosed processes of Step 1910 have all of the same properties and purpose as described for Step 910.

In Step 1912, the file system container forwards the sync command to the OS in order to commit the data, located in cache, to memory. In one or more embodiments of the invention, the method of Step 1912 is substantially similar to the method discussed in description of Step 912. Accordingly, in one embodiment of the invention, similarly disclosed processes of Step 1912 have all of the same properties and purpose as described for Step 912.

In Step 1914, the file system container generates a command to copy the data, synced in Step 1912, to the remote note. In one or more embodiments of the invention, the data manipulated by the application, executing on the local node, is normally located on a physical device of a remote node (from where it was copied). Accordingly, in one embodiment of the invention, committed changes (e.g., those resulting from a sync command of the application) are copied to the physical location of the data on the remote node.

In one or more embodiments of the invention, the space manager generates a command that instructs the one or more hardware layer components of the local node to copy the data from the local physical location (where the local application is manipulating the data) to the physical location on the remote node, from where the data was originally located.

In Step 1916, the file system container transmits the command (to copy data from local memory to the remote node) to the OS of the local node. In one or more embodiments of the invention, the file system container is further configured to await confirmation that the remote node has received and stored the modified data.

In Step 1918, the file system container receives confirmation, from the OS, that the data (associated with the sync command) was successfully copied to the remote node.

In one embodiment of the invention, if the file system container does not receive an indication that data was successfully copied to the remote node, Step 1914 and Step 1916 may be repeated. In one or more embodiments of the invention, if the file system container continues to fail to receive confirmation that the remote node successfully received the data, the file system container inform the application that the sync operation has failed and prevent further manipulation of the data. Alternatively, in one embodiment of the invention, the file system container (and/or the space manager thereof) may identify another location to store the manipulated data, until the manipulated data may be properly copied back to the remote node.

Figure 19C:
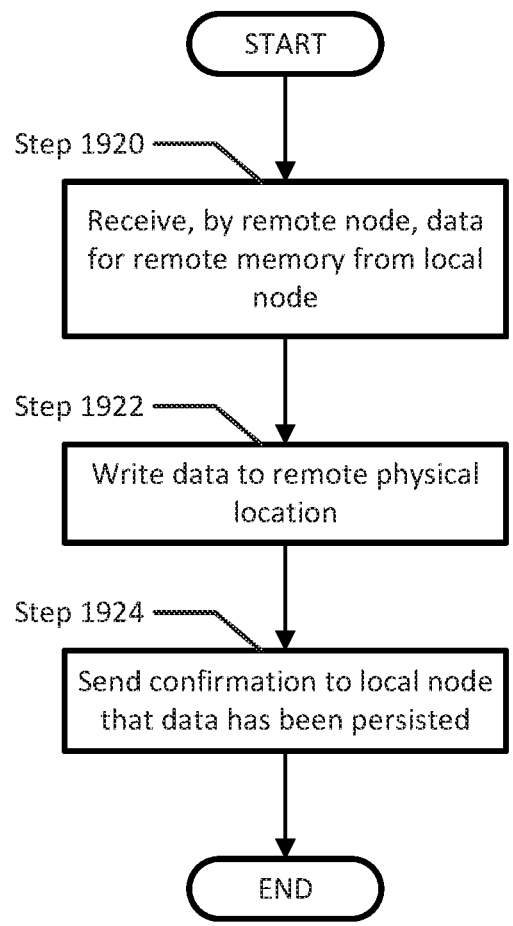
FIG. 19C shows a flowchart of a method of servicing a write request in accordance with one or more embodiments of the invention.

FIG. 19C shows a flowchart of a method for servicing a write request, in accordance with one or more embodiments of the invention. All or a portion of the method shown in FIG. 19C may be performed by the hardware layer of a remote node and/or the components thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 1920, a remote node receives data from a local node. In one or more embodiments of the invention, as discussed in the description of Step 1914, the copy request, received from local node, specifies the physical address (and associated device) on which to copy the data. In one or more embodiments of the invention, the copy request is received via a communication interface of the remote node.

In Step 1922, the remote node writes the data of the copy request to physical location specified in the copy request. In one or more embodiments of the invention, after receiving the copy request from communication interface, a processor of the remote node processes the copy request by locating the physical device (specified by the copy request) and copying that data to the physical location (as specified by the copy request).

In Step 1924, the remote node generates and transmits a confirmation, to the local node, that the data specified in the copy request was successfully copied to the local memory device and/or persistent storage device. In one or more embodiments of the invention, the confirmation is transmitted to the local node via a communication interface of the remote node.

Figure 20:
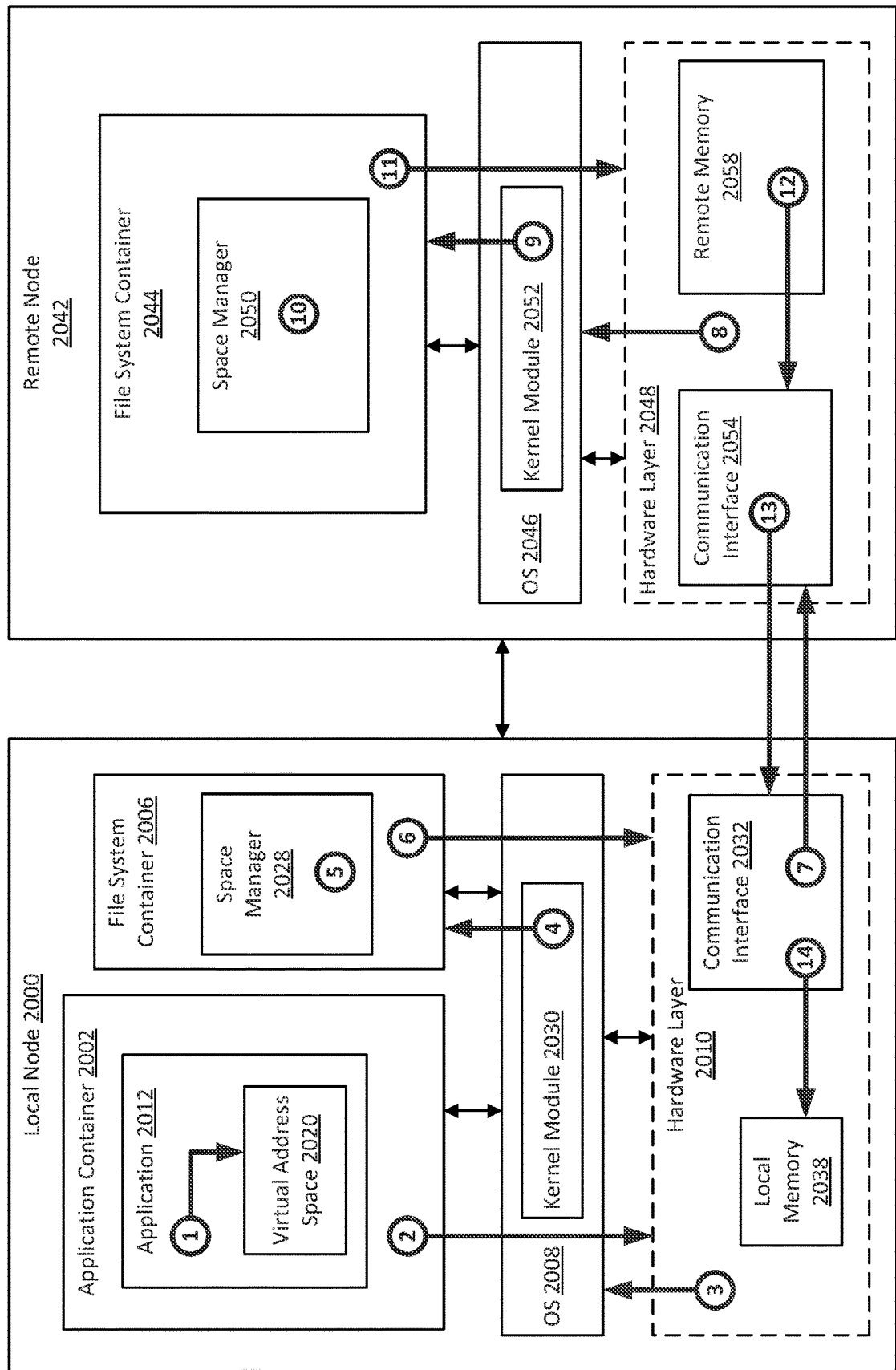
FIG. 20 shows an example in accordance with one or more embodiments of the invention.

FIG. 20 shows an example in accordance with one or more embodiments of the invention. The following use case is for explanatory purposes only and not intended to limit the scope to this embodiment.

In FIG. 20, consider a scenario in which, at (1), application (2012) issues a mapping request for data in virtual address space (2020) to establish direct access to memory (2038). The mapping request specifies a virtual address of the virtual address space (2020) and specific data using a file identifier and a file offset.

At (2), application container (2002) forwards the mapping request to the OS (2008). Here, the application container (2002) forwards the request, unaltered to the OS (2008) of the node (2000). Further, the OS (2008) passes the mapping request to hardware layer (2010) of the node (2000) without any additional processing.

At (3), the processor (2034) receives the mapping request in the hardware layer (2010) and forwards the request to the MMU (not shown). The MMU (not shown) performs a lookup in TLB (not shown) to locate a physical address associated with the virtual address of the mapping request. However, the TLB (not shown) does not contain a virtual-to-physical address mapping for the specified virtual address. Accordingly, the MMU (not shown) issues a page fault to the OS (2008) that includes the mapping request.

At (4), the kernel module (2030) detects a page fault in the OS (2008) and interrupts normal handling of the page fault by the OS (2008). Specifically, the kernel module (2030) intercepts the page fault and forwards the mapping request (of the page fault) to the file system container (2006).

At (5), the space manager (2028) of the file system container (2006) receives the mapping request and locates the file in the sparse virtual space by analyzing the file identifier to identify a logical volume associated with file identifier. However, at (5), the space manager (2028) identifies that the logical volume associated with the file identifier is not managed by the local node (2000). The space manager (2028), knowing the requested data needs to be copied to local memory (2038), from a remote node, identifies a sufficient region (e.g., physical addresses) of local memory (2038) on which to copy the requested data.

Accordingly, the space manager (2028) identifies the node that manages the identified logical volume as remote node (2042). Accordingly, space manager (2028) generates a request to receive a copy of the requested data from the remote node (2042). The copy request includes the file identifier, the file offset, an identification of the logical volume, the location (on local memory (2038) for where to copy the data to, and specifies, as the recipient, the remote node that manages the logical volume associated with the file (and therefore associated with the requested data) by using a known IP address of that remote node (2042).

At (6), the file system container (2006) sends the copy request to the hardware layer (2010) of the local node (2000). One or more components of the hardware layer (2010) then processes and the request and generates a new copy request suitable for the operative connection between local node (2000) and remote node (2042). The request is then sent to the communication interface (2032) that operatively connects the nodes (2000, 2042)

At (7), the local node (2000) sends the copy request to the remote node (2042) via communication interface (2032) of hardware layer (2010).

At (8), the copy request is received by the remote node (2042) and processed in the hardware layer (2048). The copy request is then sent to the OS (2046) for additional processing.

At (9), the kernel module (2052) of OS (2046) identifies the copy request and interrupts the normal processing of the request by the OS (2046). Specifically, the kernel module (2052) intercepts the copy request and forwards the copy request to the file system container (2044) of the remote node (2042).

At (10), the space manager (2050) of remote node (2042) receives the copy request and locates the sparse virtual space segment(s), memory and/or persistent storage pool(s), and physical location of the data associated with the data specified in the copy request.

After identifying the physical location(s) of the data specified in the copy request, the space manager (2050) generates a command to copy the data from the identified physical locations on the remote node (2042) to the local node (2000) from which the copy request originated.

At (11), the file system container (2044) of the remote node (2042) transmits the copy command, generated by the space manager (2050), to the OS (2046). After the OS (2046) receives the copy command, the OS (2046) interacts with the hardware layer (2048) to ensure servicing of the copy request.

At (12), in the hardware layer (2048) of the remote node (2042), the data specified in the copy request is sent from its location in remote memory (2058) to the communication interface (2054) operatively connected to local node (2000). To achieve this, a processor (not shown) of the hardware layer (2048) processes the copy request and generates commands to copy the requested data from remote memory (2058) via an MMU (not shown) and TLB (not shown) to communication interface (2054).

At (13), the communication interface (2054) of the remote node (2042) receives the copy request from the processor (not shown) and sends the data, specified in the copy request, to the local node (2000).

At (14), the communication interface (2032) of the local node (2000) receives the data from the remote node (2042). Further, the processor (not shown) of the hardware layer (2010) of local node (2000) processes and copies that data to the physical location of local memory (2038) identified by the space manager (2028) in at step (5).

Additionally, after the data has been copied to local memory (2038), the file system container (2006) forwards the virtual-to-physical address mapping to the MMU (not shown). In one or more embodiments of the invention, the file system container (2006) transmits the virtual-to-physical address mapping to hardware layer (2010) via the OS (2008). In turn the OS (2008) informs the application container (2002) and the application (2012) that the memory mapping request was successfully serviced, and direct access has been established.

Figure 21:
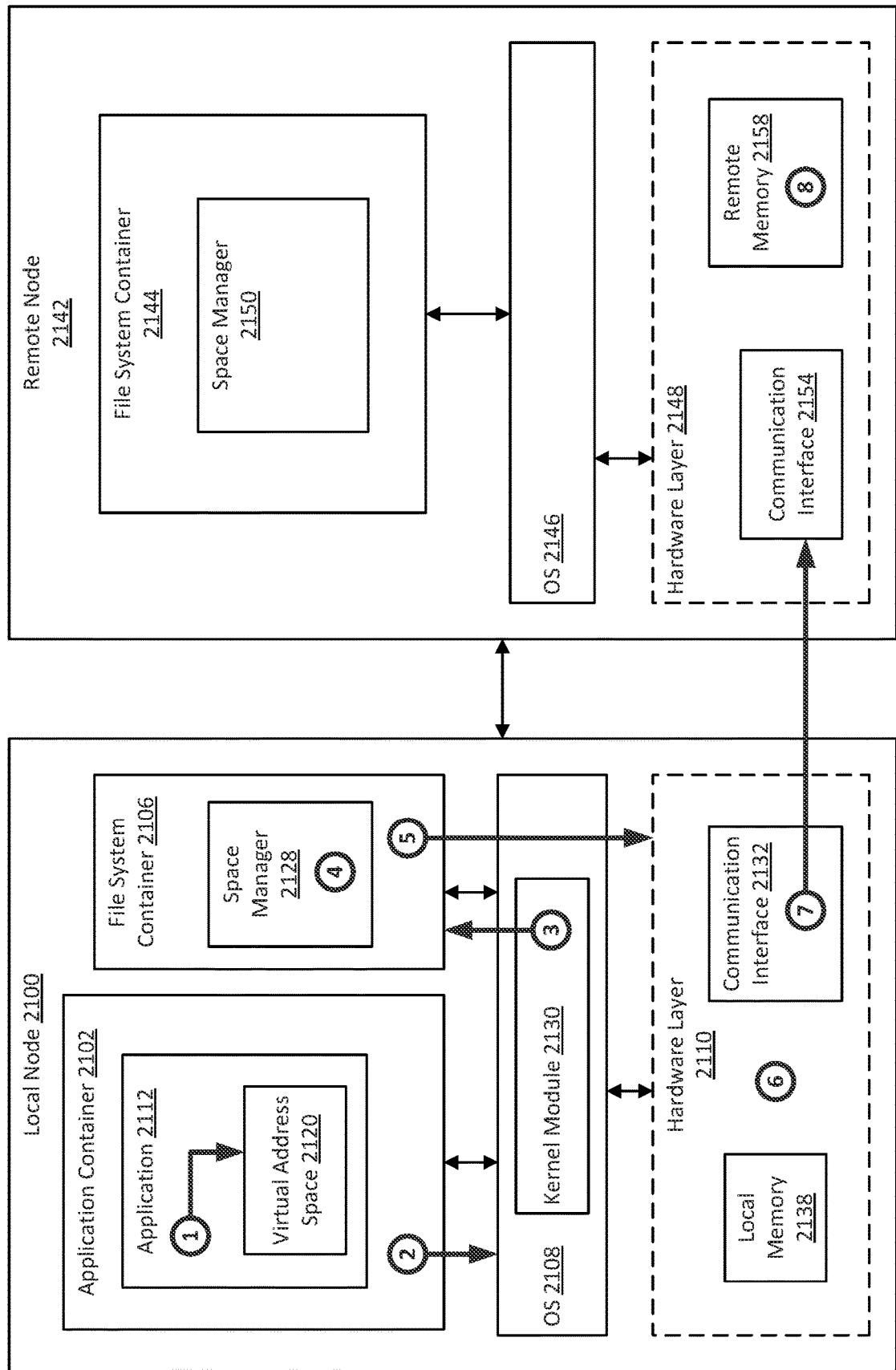
FIG. 21 shows an example in accordance with one or more embodiments of the invention.

FIG. 21 shows an example in accordance with one or more embodiments of the invention. The following use case is for explanatory purposes only and not intended to limit the scope to this embodiment.

In FIG. 21, consider a scenario in which, at (1), application (2112) issues a sync command for data being manipulated in the virtual address space (2120) via direct access to memory (2138). The sync command specifies a virtual address of the virtual address space (2120) and the modified data.

At (2), application container (2102) forwards the sync command to the OS (2108). Here, the application container (2102) forwards the request, unaltered to the OS (2108) of the node (2100). At (3), the kernel module (2130) detects the sync command in the OS (2108) and interrupts normal handling of the sync command by the OS (2108). Specifically, the kernel module (2130) intercepts the sync command and forwards the sync command to the file system container (2106).

At (4), the space manager (2128) of the file system container (2106) receives the sync command and identifies each memory segment affected by the sync command. Specifically, space manager (2128) analyzes the sync command and identifies that the sync command is associated with data that is located on remote node (2142). Thus, the space manager (2128) generates two sync commands, a first sync command to copy any uncommitted data (in processor cache, not shown) to local memory (2138) (as identified in the memory pool), and a second sync command to copy any manipulated data to the location in the remote node (2142) where the data originated (remote memory (2158)).

At (5), the file system container (2106) forwards the sync commands to the processor (1234) through OS (2108). At (6), processor (not shown) receives the sync commands, identifies all relevant, uncommitted data (in cache, not shown), associated with the sync command, and initiates copying that data to local memory (2138).

At (7), the communication interface (2132) receives the copy request from the processor (not shown) and sends the data specified in the copy request (i.e., the data which is now stored in the local memory (2138)) to the remote node (2148) via RDMA.

At (8), the remote node (2142) receives the data specified in the copy request via communication interface (2154) and copies that data to remote memory (2158). One or more components of the hardware layer (2148) of remote node (2142) coordinate receiving the data from the communication interface (2154) and copying that data to specified location in remote memory (2158).

One or more embodiments of the invention make it possible to seamlessly access memory and persistent storage using one or more file system container(s) across one or more node(s) of a cluster. Accordingly, applications, accessing the data of persistent storage and memory, are not aware of the actual physical locations of the data being accessed and manipulated. Further, the file system container is configured to handle memory mapping requests for data in persistent storage and/or on other nodes of a cluster. Thus, regardless of the physical location of the data, a file system container is able to service memory mapping requests and provide direct access to data by shifting the data, located in persistent storage and/or on a remote node, to local memory without any additional action on behalf of the application.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:

1. A method for processing requests, comprising:
receiving, by a space manager, a request comprising a virtual address, wherein the request is associated with an application executing on an operating system and wherein the space manager is executing in a container on the operating system;
identifying, based on data specified in the request, a logical volume associated with the data;
making a first determination, based on the logical volume, that the logical volume is managed by a remote node;
generating a data layout request to receive a data layout of the data from the remote node;
receiving, from the remote node, the data layout, wherein the data layout specifies a first physical address on the remote node that stores the data;
initiating a copy request to copy the data from the first physical address to a second physical address on a local node;
generating, based on the copy request, a virtual-to-physical address mapping between the virtual address and the second physical address; and
initiating processing the request using the virtual-to-physical address mapping.

2. The method of claim 1, wherein the application is executing on a second container on the operating system.

3. The method of claim 1, wherein prior to initiating the copy request, the method further comprises:
identifying a sparse virtual space segment of a sparse virtual space of the remote node, wherein the sparse virtual space segment is associated with a memory segment and wherein the memory segment is associated with the first physical address; and associating the sparse virtual space segment with the virtual address.

4. The method of claim 3,
wherein the first physical address is located on a Persistent Memory (PMem) device of the remote node,
wherein the second physical address is located on a PMem device of the local node.

5. The method of claim 4, wherein the copy request specifies using Remote Direct Memory Access (RDMA) to copy the data from the first physical address to the second physical address.

6. The method of claim 1, wherein the data layout request specifies a pool segment of a pool associated with the data.

7. The method of claim 6, wherein the pool is a memory pool and the pool segment is a memory pool segment.

8. A non-transitory computer readable medium comprising instructions which, when executed by a computer processor, enables the computer processor to perform a method for processing requests, the method comprising:
receiving, by a space manager, a request comprising a virtual address, wherein the request is associated with an application executing on an operating system and wherein the space manager is executing in a container on the operating system;
identifying, based on data specified in the request, a logical volume associated with the data;
making a first determination, based on the logical volume, that the logical volume is managed by a remote node;
generating a data layout request to receive a data layout of the data from the remote node;
receiving, from the remote node, the data layout, wherein the data layout specifies a first physical address on the remote node that stores the data;
initiating a copy request to copy the data from the first physical address to a second physical address on a local node;
generating, based on the copy request, a virtual-to-physical address mapping between the virtual address and the second physical address; and
initiating processing the request using the virtual-to-physical address mapping.

9. The non-transitory computer readable medium of claim 8, wherein the application is executing on a second container on the operating system.

10. The non-transitory computer readable medium of claim 8, wherein prior to initiating the copy request, the method further comprises:
identifying a sparse virtual space segment of a sparse virtual space of the remote node, wherein the sparse virtual space segment is associated with a memory segment and wherein the memory segment is associated with the first physical address; and
associating the sparse virtual space segment with the virtual address.

11. The non-transitory computer readable medium of claim 10,
wherein the first physical address is located on a Persistent Memory (PMem) device of the remote node,
wherein the second physical address is located on a PMem device of the local node.

12. The non-transitory computer readable medium of claim 11, wherein the copy request specifies using Remote Direct Memory Access (RDMA) to copy the data from the first physical address to the second physical address.

13. The non-transitory computer readable medium of claim 8, wherein the data layout request specifies a pool segment of a pool associated with the data.

14. The non-transitory computer readable medium of claim 13, wherein the pool is a memory pool and the pool segment is a memory pool segment.

15. A node, comprising:
memory;
persistent storage; and a processor, wherein the processor is configured to:
receive a request comprising a virtual address, wherein the request is associated with an application executing on an operating system;
identify, based on data specified in the request, a logical volume associated with the data; make a first determination, based on the logical volume, that the logical volume is managed by a remote node;
generate a data layout request to receive a data layout of the data from the remote node;
receive, from the remote node, the data layout, wherein the data layout specifies a first physical address on the remote node that stores the data;
initiate a copy request to copy the data from the first physical address to a second physical address on a local node;
generate, based on the copy request, a virtual-to-physical address mapping between the virtual address and the second physical address;
and initiating processing the request using the virtual-to-physical address mapping.

16. The node of claim 15, wherein the application is executing on a second container on the operating system.

17. The node of claim 15, wherein prior to initiating the copy request, the processor is further configured to:
identify a sparse virtual space segment of a sparse virtual space of the remote node, wherein the sparse virtual space segment is associated with a memory segment and wherein the memory segment is associated with the first physical address; and
associate the sparse virtual space segment with the virtual address.

18. The node of claim 17,
wherein the first physical address is located on a Persistent Memory (PMem) device of the remote node,
wherein the second physical address is located on a PMem device of the local node.

19. The node of claim 18, wherein the copy request specifies using Remote Direct Memory Access (RDMA) to copy the data from the first physical address to the second physical address.

20. The node of claim 15, wherein the data layout request specifies a pool segment of a pool associated with the data.

* * * * *

UNITED STATES PATENT AND TRADEMARK OFFICE
CERTIFICATE OF CORRECTION

PATENT NO. : 11,150,845 B2
APPLICATION NO. : 16/672236
DATED : October 19, 2021
INVENTOR(S) : Jean-Pierre Bono, Marc A. De Souter and Adrian Michaud Page 1 of 1

It is certified that error appears in the above-identified patent and that said Letters Patent is hereby corrected as shown below:

In the Claims

Column 48, Line 36 in Claim 16, the phrase "The node of claim 15, wherein the application is executing on a second container on the operating system" should read -- The node of claim 15, wherein the application is executing on a container on the operating system --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*